(12) United States Patent
Mohajer et al.

(10) Patent No.: US 11,295,730 B1
(45) Date of Patent: Apr. 5, 2022

(54) USING PHONETIC VARIANTS IN A LOCAL CONTEXT TO IMPROVE NATURAL LANGUAGE UNDERSTANDING

(71) Applicant: SoundHound, Inc., Santa Clara, CA (US)

(72) Inventors: Keyvan Mohajer, Los Gatos, CA (US); Christopher Wilson, Sunnyvale, CA (US); Bernard Mont-Reynaud, Sunnyvale, CA (US)

(73) Assignee: SoundHound, Inc., Santa Clara, CA (US)

( * ) Notice: Subject to any disclaimer, the term of this patent is extended or adjusted under 35 U.S.C. 154(b) by 151 days.

(21) Appl. No.: 16/529,689

(22) Filed: Aug. 1, 2019

Related U.S. Application Data

(63) Continuation of application No. 14/634,642, filed on Feb. 27, 2015, now abandoned.

(60) Provisional application No. 61/945,733, filed on Feb. 27, 2014.

(51) Int. Cl.
*G10L 15/18* (2013.01)
*G10L 15/19* (2013.01)

(52) U.S. Cl.
CPC ...... *G10L 15/1815* (2013.01); *G10L 15/1822* (2013.01); *G10L 15/19* (2013.01)

(58) Field of Classification Search
CPC .. G10L 15/1815; G10L 15/1822; G10L 15/19
See application file for complete search history.

(56) References Cited

U.S. PATENT DOCUMENTS

| 3,919,479 A | 11/1975 | Moon et al. |
| 4,450,531 A | 5/1984 | Kenyon et al. |
| 4,697,209 A | 9/1987 | Kiewit et al. |
| 4,739,398 A | 4/1988 | Thomas et al. |

(Continued)

FOREIGN PATENT DOCUMENTS

| EP | 0944033 A1 | 9/1999 |
| EP | 1367590 A2 | 12/2003 |

(Continued)

OTHER PUBLICATIONS

Huet et al., "Morpho-syntactic post-processing of N-best lists for improved French automatic speech recognition," Computer Speech & Language, vol. 24, Issue 4, 2010, pp. 663-684, ISSN 0885-2308, https://doi.org/10.1016/j.csl.2009.10.001. (Year: 2010).*

(Continued)

*Primary Examiner* — Michelle M Koeth
(74) *Attorney, Agent, or Firm* — Haynes Beffel & Wolfeld LLP; Andrew Dunlap

(57) ABSTRACT

A method is described that includes processing text and speech from an input utterance using local overrides of default dictionary pronunciations. Applying this method, a word-level grammar used to process the tokens specifies at least one local word phonetic variant that applies within a specific production rule and, within a local context of the specific production rule, the local word phonetic variant overrides one or more default dictionary phonetic versions of the word. This method can be applied to parsing utterances where the pronunciation of some words depends on their syntactic or semantic context.

24 Claims, 7 Drawing Sheets

(56) References Cited

U.S. PATENT DOCUMENTS

| | | |
|---|---|---|
| 4,843,562 A | 6/1989 | Kenyon et al. |
| 4,918,730 A | 4/1990 | Schulze |
| 4,928,249 A | 5/1990 | Vermesse |
| 4,959,850 A | 9/1990 | Marui |
| 5,019,899 A | 5/1991 | Boles et al. |
| 5,033,087 A | 7/1991 | Bahl et al. |
| 5,054,074 A | 10/1991 | Bakis |
| 5,164,915 A | 11/1992 | Blyth |
| 5,436,653 A | 7/1995 | Ellis et al. |
| 5,437,050 A | 7/1995 | Lamb et al. |
| 5,457,768 A | 10/1995 | Tsuboi et al. |
| 5,511,000 A | 4/1996 | Kaloi et al. |
| 5,542,138 A | 8/1996 | Williams et al. |
| 5,577,249 A | 11/1996 | Califano |
| 5,581,658 A | 12/1996 | O'Hagan et al. |
| 5,634,084 A | 5/1997 | Malsheen et al. |
| 5,664,270 A | 9/1997 | Bell et al. |
| 5,687,279 A | 11/1997 | Matthews |
| 5,708,477 A | 1/1998 | Forbes et al. |
| 5,845,306 A | 12/1998 | Schabes et al. |
| 5,862,260 A | 1/1999 | Rhoads |
| 5,874,686 A | 2/1999 | Ghias et al. |
| 5,880,386 A | 3/1999 | Wachi et al. |
| 5,907,815 A | 5/1999 | Grimm et al. |
| 5,918,223 A | 6/1999 | Blum et al. |
| 5,956,683 A | 9/1999 | Jacobs et al. |
| 5,963,957 A | 10/1999 | Hoffberg |
| 5,969,283 A | 10/1999 | Looney et al. |
| 5,974,409 A | 10/1999 | Sanu et al. |
| 5,991,737 A | 11/1999 | Chen |
| 6,049,710 A | 4/2000 | Nilsson |
| 6,067,516 A | 5/2000 | Levay et al. |
| 6,092,039 A | 7/2000 | Zingher |
| 6,098,042 A | 8/2000 | Huynh |
| 6,108,626 A | 8/2000 | Cellario et al. |
| 6,121,530 A | 9/2000 | Sonoda |
| 6,122,403 A | 9/2000 | Rhoads |
| 6,163,767 A | 12/2000 | Tang et al. |
| 6,182,128 B1 | 1/2001 | Kelkar et al. |
| 6,188,985 B1 | 2/2001 | Thrift et al. |
| 6,201,176 B1 | 3/2001 | Yourlo |
| 6,233,682 B1 | 5/2001 | Fritsch |
| 6,292,767 B1 | 9/2001 | Jackson et al. |
| 6,314,577 B1 | 11/2001 | Pocock |
| 6,345,256 B1 | 2/2002 | Milsted et al. |
| 6,363,349 B1 | 3/2002 | Urs et al. |
| 6,385,434 B1 | 5/2002 | Chuprun et al. |
| 6,405,029 B1 | 6/2002 | Nilsson |
| 6,408,272 B1 | 6/2002 | White et al. |
| 6,434,520 B1 | 8/2002 | Kanevsky et al. |
| 6,453,252 B1 | 9/2002 | Laroche |
| 6,487,532 B1 | 11/2002 | Schoofs et al. |
| 6,504,089 B1 | 1/2003 | Negishi et al. |
| 6,505,160 B1 | 1/2003 | Levy et al. |
| 6,507,727 B1 | 1/2003 | Henrick |
| 6,510,325 B1 | 1/2003 | Mack, II et al. |
| 6,519,564 B1 | 2/2003 | Hoffberg et al. |
| 6,535,849 B1 | 3/2003 | Pakhomov et al. |
| 6,542,869 B1 | 4/2003 | Foote |
| 6,594,628 B1 | 7/2003 | Jacobs et al. |
| 6,611,607 B1 | 8/2003 | Davis et al. |
| 6,614,914 B1 | 9/2003 | Rhoads et al. |
| 6,629,066 B1 | 9/2003 | Jackson et al. |
| 6,631,346 B1 | 10/2003 | Karaorman et al. |
| 6,633,845 B1 | 10/2003 | Logan et al. |
| 6,633,846 B1 | 10/2003 | Bennett et al. |
| 6,640,306 B1 | 10/2003 | Tone et al. |
| 6,708,150 B1 | 3/2004 | Hirayama et al. |
| 6,804,645 B1 | 10/2004 | Kleinschmidt |
| 6,834,308 B1 | 12/2004 | Ikezoye et al. |
| 6,850,288 B2 | 2/2005 | Kurokawa |
| 6,879,950 B1 | 4/2005 | Mackie et al. |
| 6,931,451 B1 | 8/2005 | Logan et al. |
| 6,941,275 B1 | 9/2005 | Swierczek |
| 6,967,275 B2 | 11/2005 | Ozick |
| 6,990,453 B2 | 1/2006 | Wang et al. |
| 6,995,309 B2 | 2/2006 | Samadani et al. |
| 6,996,529 B1 | 2/2006 | Minnis |
| 7,017,208 B2 | 3/2006 | Weismiller et al. |
| 7,058,376 B2 | 6/2006 | Logan et al. |
| 7,085,716 B1 | 8/2006 | Even et al. |
| 7,174,293 B2 | 2/2007 | Kenyon et al. |
| 7,190,971 B1 | 3/2007 | Kawamoto |
| 7,206,820 B1 | 4/2007 | Rhoads et al. |
| 7,209,892 B1 | 4/2007 | Galuten et al. |
| 7,225,132 B2 | 5/2007 | Attwater et al. |
| 7,233,321 B1 | 6/2007 | Larson et al. |
| 7,257,536 B1 | 8/2007 | Finley et al. |
| 7,266,343 B1 | 9/2007 | Yli-juuti et al. |
| 7,266,495 B1 | 9/2007 | Beaufays et al. |
| 7,323,629 B2 | 1/2008 | Somani et al. |
| 7,328,153 B2 | 2/2008 | Wells et al. |
| 7,373,209 B2 | 5/2008 | Tagawa et al. |
| 7,379,875 B2 | 5/2008 | Burges et al. |
| 7,444,353 B1 | 10/2008 | Chen et al. |
| 7,464,065 B2 | 12/2008 | Gleason et al. |
| 7,516,074 B2 | 4/2009 | Bilobrov |
| 7,562,392 B1 | 7/2009 | Rhoads et al. |
| 7,567,899 B2 | 7/2009 | Bogdanov |
| 7,580,832 B2 | 8/2009 | Allamanche et al. |
| 7,606,708 B2 | 10/2009 | Hwang |
| 7,672,916 B2 | 3/2010 | Poliner et al. |
| 7,693,720 B2 | 4/2010 | Kennewick et al. |
| 7,698,136 B1 | 4/2010 | Nguyen et al. |
| 7,743,092 B2 | 6/2010 | Wood |
| 7,756,874 B2 | 7/2010 | Hoekman et al. |
| 7,765,097 B1 | 7/2010 | Yu et al. |
| 7,783,489 B2 | 8/2010 | Kenyon et al. |
| 7,853,664 B1 | 12/2010 | Wang et al. |
| 7,858,868 B2 | 12/2010 | Kemp et al. |
| 7,881,657 B2 | 2/2011 | Wang et al. |
| 7,899,818 B2 | 3/2011 | Stonehocker et al. |
| 7,904,297 B2 | 3/2011 | Mirkovic et al. |
| 7,908,135 B2 | 3/2011 | Shishido |
| 8,013,230 B2 | 9/2011 | Eggink |
| 8,073,684 B2 | 12/2011 | Sundareson |
| 8,086,171 B2 | 12/2011 | Wang et al. |
| 8,099,281 B2 | 1/2012 | Gleason |
| 8,116,746 B2 | 2/2012 | Lu et al. |
| 8,296,179 B1 | 10/2012 | Rennison |
| 8,358,966 B2 | 1/2013 | Zito et al. |
| 8,447,608 B1 | 5/2013 | Chang et al. |
| 8,694,537 B2 | 4/2014 | Mohajer |
| 8,762,156 B2 | 6/2014 | Chen |
| 8,924,212 B1 | 12/2014 | Allauzen et al. |
| 9,697,827 B1 * | 7/2017 | Lilly ..................... G10L 15/14 |
| 2001/0005823 A1 | 6/2001 | Fischer et al. |
| 2001/0014891 A1 | 8/2001 | Hoffert et al. |
| 2001/0049601 A1 | 12/2001 | Kroeker et al. |
| 2001/0053974 A1 | 12/2001 | Lucke et al. |
| 2002/0023020 A1 | 2/2002 | Kenyon et al. |
| 2002/0042707 A1 | 4/2002 | Zhao et al. |
| 2002/0048350 A1 | 4/2002 | Phillips et al. |
| 2002/0049037 A1 | 4/2002 | Christensen et al. |
| 2002/0072982 A1 | 6/2002 | Barton et al. |
| 2002/0083060 A1 | 6/2002 | Wang et al. |
| 2002/0111806 A1 | 8/2002 | Franz et al. |
| 2002/0116191 A1 | 8/2002 | Olsen et al. |
| 2002/0138265 A1 * | 9/2002 | Stevens ................. G10L 15/22 |
| | | 704/251 |
| 2002/0138630 A1 | 9/2002 | Solomon et al. |
| 2002/0156627 A1 | 10/2002 | Itoh et al. |
| 2002/0174431 A1 | 11/2002 | Bowman et al. |
| 2002/0181671 A1 | 12/2002 | Logan |
| 2002/0193895 A1 | 12/2002 | Qian et al. |
| 2002/0198705 A1 | 12/2002 | Burnett |
| 2002/0198713 A1 | 12/2002 | Franz et al. |
| 2002/0198719 A1 | 12/2002 | Gergic et al. |
| 2002/0198789 A1 | 12/2002 | Waldman |
| 2003/0004717 A1 | 1/2003 | Strom et al. |
| 2003/0009335 A1 | 1/2003 | Schalkwyk et al. |
| 2003/0023437 A1 | 1/2003 | Fung |
| 2003/0040901 A1 | 2/2003 | Wang |
| 2003/0050784 A1 | 3/2003 | Hoffberg et al. |

(56) References Cited

U.S. PATENT DOCUMENTS

| | | |
|---|---|---|
| 2003/0078928 A1 | 4/2003 | Dorosario et al. |
| 2003/0083863 A1 | 5/2003 | Ringger et al. |
| 2003/0106413 A1 | 6/2003 | Samadani et al. |
| 2003/0110035 A1 | 6/2003 | Thong et al. |
| 2003/0125945 A1 | 7/2003 | Doyle |
| 2003/0163320 A1 | 8/2003 | Yamazaki et al. |
| 2003/0167166 A1 | 9/2003 | Mann |
| 2003/0187649 A1 | 10/2003 | Logan et al. |
| 2003/0191645 A1 | 10/2003 | Zhou |
| 2003/0192424 A1 | 10/2003 | Koike |
| 2004/0002858 A1 | 1/2004 | Attias et al. |
| 2004/0019497 A1 | 1/2004 | Volk et al. |
| 2004/0167779 A1 | 8/2004 | Lucke et al. |
| 2004/0193420 A1 | 9/2004 | Kennewick et al. |
| 2004/0231498 A1 | 11/2004 | Li et al. |
| 2005/0010412 A1 | 1/2005 | Aronowitz |
| 2005/0016360 A1 | 1/2005 | Zhang |
| 2005/0027699 A1 | 2/2005 | Awadallah et al. |
| 2005/0033574 A1 | 2/2005 | Kim et al. |
| 2005/0060685 A1 | 3/2005 | Franz et al. |
| 2005/0086059 A1 | 4/2005 | Bennett |
| 2005/0125232 A1 | 6/2005 | Gadd |
| 2005/0137939 A1 | 6/2005 | Calabria et al. |
| 2005/0143970 A1 | 6/2005 | Roth et al. |
| 2005/0144064 A1 | 6/2005 | Calabria et al. |
| 2005/0144065 A1 | 6/2005 | Calabria et al. |
| 2005/0254366 A1 | 11/2005 | Amar |
| 2005/0256715 A1 | 11/2005 | Okimoto et al. |
| 2005/0273326 A1 | 12/2005 | Padhi et al. |
| 2006/0004572 A1 | 1/2006 | Ju et al. |
| 2006/0059225 A1 | 3/2006 | Stonehocker et al. |
| 2006/0069547 A1 | 3/2006 | Wang et al. |
| 2006/0095250 A1 | 5/2006 | Chen et al. |
| 2006/0122839 A1 | 6/2006 | Li-Chun Wang et al. |
| 2006/0129396 A1* | 6/2006 | Ju ............... G10L 15/063 704/243 |
| 2006/0155694 A1 | 7/2006 | Chowdhury et al. |
| 2006/0169126 A1 | 8/2006 | Ishiwata et al. |
| 2006/0189298 A1 | 8/2006 | Marcelli |
| 2006/0224384 A1 | 10/2006 | Dow et al. |
| 2006/0242017 A1 | 10/2006 | Libes et al. |
| 2006/0277030 A1 | 12/2006 | Bedworth |
| 2006/0277052 A1 | 12/2006 | He et al. |
| 2006/0282266 A1 | 12/2006 | Lopez-Barquilla et al. |
| 2007/0010195 A1 | 1/2007 | Brown et al. |
| 2007/0016404 A1 | 1/2007 | Kim et al. |
| 2007/0038453 A1* | 2/2007 | Yamamoto ........ G10L 15/187 704/257 |
| 2007/0055500 A1 | 3/2007 | Bilobrov |
| 2007/0120689 A1 | 5/2007 | Zerhusen et al. |
| 2007/0156392 A1 | 7/2007 | Balchandran et al. |
| 2007/0168409 A1 | 7/2007 | Cheung |
| 2007/0168413 A1 | 7/2007 | Barletta et al. |
| 2007/0204319 A1 | 8/2007 | Ahmad et al. |
| 2007/0208569 A1 | 9/2007 | Subramanian et al. |
| 2007/0239676 A1 | 10/2007 | Stonehocker et al. |
| 2007/0260456 A1 | 11/2007 | Proux et al. |
| 2007/0260634 A1 | 11/2007 | Makela et al. |
| 2007/0288444 A1 | 12/2007 | Nelken et al. |
| 2008/0022844 A1 | 1/2008 | Poliner et al. |
| 2008/0026355 A1 | 1/2008 | Petef |
| 2008/0046247 A1 | 2/2008 | Kurata et al. |
| 2008/0059185 A1 | 3/2008 | Chung et al. |
| 2008/0059188 A1 | 3/2008 | Konopka et al. |
| 2008/0082510 A1 | 4/2008 | Wang et al. |
| 2008/0126089 A1 | 5/2008 | Printz et al. |
| 2008/0134264 A1 | 6/2008 | Narendra et al. |
| 2008/0148224 A1 | 6/2008 | Donovan et al. |
| 2008/0154951 A1 | 6/2008 | Martinez et al. |
| 2008/0172224 A1 | 7/2008 | Liu et al. |
| 2008/0215319 A1 | 9/2008 | Lu et al. |
| 2008/0228496 A1 | 9/2008 | Yu et al. |
| 2008/0235017 A1 | 9/2008 | Satomura |
| 2008/0235872 A1 | 10/2008 | Newkirk et al. |
| 2008/0249982 A1 | 10/2008 | Lakowske |
| 2008/0255937 A1 | 10/2008 | Chang et al. |
| 2008/0256115 A1 | 10/2008 | Beletski et al. |
| 2008/0270129 A1* | 10/2008 | Colibro ............ G10L 15/187 704/236 |
| 2009/0013255 A1 | 1/2009 | Yuschik et al. |
| 2009/0030686 A1 | 1/2009 | Weng et al. |
| 2009/0031882 A1 | 2/2009 | Kemp et al. |
| 2009/0037174 A1 | 2/2009 | Seltzer et al. |
| 2009/0063147 A1 | 3/2009 | Roy |
| 2009/0064029 A1 | 3/2009 | Corkran et al. |
| 2009/0112593 A1 | 4/2009 | Konig et al. |
| 2009/0119097 A1 | 5/2009 | Master et al. |
| 2009/0125298 A1 | 5/2009 | Master et al. |
| 2009/0125301 A1 | 5/2009 | Master et al. |
| 2009/0125306 A1 | 5/2009 | Lejeune et al. |
| 2009/0150341 A1 | 6/2009 | Paek et al. |
| 2009/0216525 A1 | 8/2009 | Shostak |
| 2009/0228799 A1 | 9/2009 | Verbeeck et al. |
| 2009/0240488 A1 | 9/2009 | White et al. |
| 2009/0240499 A1 | 9/2009 | Dvir et al. |
| 2009/0271199 A1 | 10/2009 | Agapi et al. |
| 2010/0014828 A1 | 1/2010 | Sandstrom et al. |
| 2010/0042414 A1 | 2/2010 | Lewis et al. |
| 2010/0049514 A1 | 2/2010 | Kennewick et al. |
| 2010/0100384 A1 | 4/2010 | Ju et al. |
| 2010/0124892 A1 | 5/2010 | Issa et al. |
| 2010/0158488 A1 | 6/2010 | Roberts et al. |
| 2010/0205166 A1 | 8/2010 | Boulter et al. |
| 2010/0211693 A1 | 8/2010 | Master et al. |
| 2010/0235341 A1 | 9/2010 | Bennett |
| 2010/0241418 A1 | 9/2010 | Maeda et al. |
| 2010/0250497 A1 | 9/2010 | Redlich et al. |
| 2010/0286979 A1 | 11/2010 | Zangvil et al. |
| 2010/0312782 A1 | 12/2010 | Li et al. |
| 2011/0035219 A1 | 2/2011 | Kadirkamanathan et al. |
| 2011/0046951 A1 | 2/2011 | Suendermann et al. |
| 2011/0071819 A1 | 3/2011 | Miller et al. |
| 2011/0082688 A1 | 4/2011 | Kim et al. |
| 2011/0131043 A1 | 6/2011 | Adachi et al. |
| 2011/0132173 A1 | 6/2011 | Shishido |
| 2011/0132174 A1 | 6/2011 | Shishido |
| 2011/0173208 A1 | 7/2011 | Vogel |
| 2011/0213475 A1 | 9/2011 | Herberger et al. |
| 2011/0244784 A1 | 10/2011 | Wang |
| 2011/0276334 A1 | 11/2011 | Wang et al. |
| 2011/0288855 A1 | 11/2011 | Roy |
| 2012/0029670 A1 | 2/2012 | Mont-Reynaud et al. |
| 2012/0035924 A1 | 2/2012 | Jitkoff et al. |
| 2012/0046936 A1 | 2/2012 | Kandekar et al. |
| 2012/0065960 A1 | 3/2012 | Iwama et al. |
| 2012/0089400 A1 | 4/2012 | Henton |
| 2012/0216178 A1 | 8/2012 | Gellerich et al. |
| 2012/0232683 A1 | 9/2012 | Master et al. |
| 2012/0303371 A1 | 11/2012 | Labsky et al. |
| 2012/0323557 A1 | 12/2012 | Koll et al. |
| 2013/0006631 A1 | 1/2013 | Gunther et al. |
| 2013/0041647 A1 | 2/2013 | Ramerth et al. |
| 2013/0052939 A1 | 2/2013 | Anniballi et al. |
| 2013/0055223 A1 | 2/2013 | Xu |
| 2013/0096911 A1* | 4/2013 | Beaufort ............ H04L 51/38 704/9 |
| 2013/0151250 A1 | 6/2013 | VanBlon |
| 2014/0019483 A1 | 1/2014 | Mohajer |
| 2014/0032220 A1 | 1/2014 | Lerner |
| 2014/0067394 A1 | 3/2014 | Abuzeina et al. |
| 2014/0074470 A1 | 3/2014 | Jansche et al. |
| 2014/0205974 A1 | 7/2014 | Pellom et al. |
| 2014/0297252 A1 | 10/2014 | Prasad et al. |
| 2014/0316785 A1 | 10/2014 | Bennett et al. |
| 2014/0324427 A1 | 10/2014 | Di Fabbrizio et al. |
| 2014/0324433 A1 | 10/2014 | Hsiao |
| 2014/0358533 A1 | 12/2014 | Kurata et al. |
| 2015/0039317 A1 | 2/2015 | Klein et al. |
| 2015/0106082 A1 | 4/2015 | Ge et al. |
| 2015/0112679 A1 | 4/2015 | Zhang |
| 2015/0161985 A1* | 6/2015 | Peng ............... G10L 15/063 704/235 |
| 2016/0232894 A1 | 8/2016 | Park et al. |
| 2021/0224043 A1 | 7/2021 | Mont-Reynaud et al. |

(56) References Cited

U.S. PATENT DOCUMENTS

FOREIGN PATENT DOCUMENTS

| JP | H11-272274 | A  | 10/1999 |
|----|------------|----|---------|
| JP | 2000187671 | A  | 7/2000  |
| WO | 9517746    | A1 | 6/1995  |
| WO | 99/18518   | A2 | 4/1999  |
| WO | 03061285   | A2 | 7/2003  |
| WO | 2004091307 | A2 | 10/2004 |
| WO | 2008004181 | A2 | 1/2008  |
| WO | 2010018586 | A2 | 2/2010  |
| WO | 2013177213 | A2 | 11/2013 |

OTHER PUBLICATIONS

Ranta, A., "Grammatical Framework: Programming with Multilingual Grammars," Slides for the GF book, CSLI Stanford, Copyright 2011, 440 pages.
Ranta, A., "Grammatical Framework Tutorial", Copyright Dec. 2010 for GF 3.2 [retrieved on Sep. 13, 2012], Retrieved from Internet: <http://www.grammaticalframework.org/doc/tutorial/gf-tutorial.htmi> 68 pages.
"Grammatical Framework" Version 3.3.3, Copyright Mar. 2012 [retrieved on Sep. 23, 2012], Retrieved from Internet <http://www.grammaticalframework.org>. 4 pages.
VoiceXML Tutorial (NUANCE), BeVocal, Inc., Mountain View, CA, Copyright 2005, 68 pages.
JavaScript Quick Reference, BeVocal Inc. (NUANCE), Mountain View, CA, Copyright 2005, 24 pages.
Grammar Reference, BeVocal, Inc. (NUANCE), Mountain View, CA, Copyright 2005, 102 pages.
Ranta, A., "Creating Linguistic Resources with the Grammatical Framewor," LREC Tutorial, Malta, May 17, 2010, 75 pages.
Conway, D., et al., "Synopsis 5: Regexes and Rules", Version 158, Created Jun. 24, 2002 and Last Modified Jul. 31, 2012 [retrieved Sep. 26, 2012], Retrieved from Internet: <http://perlcabal.org/syn/s05.html>, 65 pages.
Grammar's Developers Guide, Nuance Speech Recognition System, Version 8.5, Copyright 2003 Nuance Communications Inc., Menlo Park, CA, 262 pages.
Wang, A.L., "An Industrial-Strength Audio Search Algorithm," In ISMIR 2003,4th Symposium Conference on Music Information Retrieval(Oct. 26, 2003), pp. 7-13.
Venkatachalam, V., Cazzanti, L., Chillon, N., Wells, M., "Automatic Identification of Sound Recordings," Signal Processing Magazine, IEEE, Mar. 2004, 92-99, vol. 21, Issue 2.
Nelson, J., V Cast Song ID from Verizon Wireless. May 21, 2007 [retrieved on Jul. 24, 2014], Retrieved from Internet: <http://www.verizonwireless.com/news/article/2007/05/pr2007-05-21a.html>.
Gracenote: MusicID, available at http://www.gracenote.com/business.sub.-solutions/music.sub.-id/, last accessed Aug. 4, 2010.
Shazam: http://web.archive.org/web/20100501190631/http://www.shazam.com/. Last accessed May 1, 2010.
App Shopper Shazam: http://appshopper.com/music/shazam. Last changed Jul. 24, 2014.
Gracenote Mobile MusicID: http://web.archive.org/web/20100123211802/http://www.gracenote.com/busine-ss.sub.-solutions/mobileMusic/. Last accessed Jan. 23, 2010.
App Shopper MusicID: http://appshopper.com/music/musicid. Last changed Jul. 14, 2014.
Xu, et al. "Music Identification Via Vocabulary Tree with MFCC Peaks," MIRUM '11 Proceedings of the 1st International ACM workshop on Music information retrieval with user-centered and multimodal strategies, 2011. p. 21-26.http://dl.acm.org/citation.cfm?doid=2072529.2072537.
Li, et al. "Robust Audio Identification for MP3 Popular Music," SIGIR '10 Proceedings of the 33rd international ACM SIGIR conference on Research and development in information retrieval, Jul. 2010. p. 627-634.http://dl.acm.org/citation.cfm?doid=1835449.1835554.

Yu, et al. "A Query-By-Singing System for Retrieving Karaoke Music," IEEE Transactions on Multimedia, Dec. 2008, vol. 10, No. 8, p. 1626-1637. http://ieeexplore.ieee.org/xpl/articleDetails.jsp7arnumber=4694852.
Liu, et al. "Content-Based Retrieval of MP3 Music Objects," CIKM '01 Proceedings of the tenth international conference on Information and knowledge management, 2001. p. 506-511. http://dx.doi.org/10.1145/502585.502670.
OMRAS2—Ontology-Driven Music Retrieval & Annotation Sharing Service. Overview—Apr. 24, 2009 [Accessed Jul. 24, 2014—Archive.org] http://web.archive.org/web/20090424083019/http://www.omras2.org/overview. 2 pages.
OMRAS2—AudioDB-Populating and Querying an AudioDB Instance. (No archived version available—accessed Jul. 24, 2014 via Google) http://omras2.org/audioDB/tutorial1. 3 pages.
Benson, et al. "Sync Kit: A Persistent Client-Side Database Caching Toolkit for Data Intensive Websites," Proceedings of The 19th International Conference on World Wide Web, Apr. 2010. pp. 121-130. http://dl.acm.org/citation.cfm?id=1772704. cited byapplicant.
Larson, et al. "NYT to Release Thesaurus and Enter Linked Data Cloud," NY Times Blogs, Jun. 2009. http://open.blogs.nytimescom/2009/06/26/nyt-to-release-thesaurus-and-ent-erlinked-data-cloud/.
"Aurix Enhances Effectiveness Of Leading Search Software," Aurix.com—News. Jun. 1, 2010. http://www.aurix.com/pages/3808/Aurix sub-enhances.sub.—effectiveness.—sub.—of .sub.—leading.sub.—search.sub—software.htm.
"Hearing it Loud & Clear at SpeechTEK 2010," Aurix.com-News. Jul. 21, 2010, http://www.aurix.com/pages/4161/State.sub.—of .sub.—the.sub.—art.sub.—speech.sub.—technology.htm.
Jamil, "A Natural Language Interface Plug-In For Cooperative Query Answering In Biological Databases," BMC Genomics, Nov. 2011. (Accessed Sep. 27, 2012 via SpringerLink) http://www.biomedcentral.com/1471-2164/13/S3/S4.
Feng, "A General Framework for Building Natural Language Understanding Modules in Voice Search," 2010 IEEE International Conference on Acoustics Speech and Signal Processing (ICASSP), Mar. 2010. (Accessed Jul. 24, 2014—IEEE)http://ieeexplore.ieee.org/xpl/articleDetails.jsp?arnumber=5494951.
Langanke, "Direct Voice Control Speech Data Entry and Database Query Models," International Symposium on Logistics and Industrial Informatics, Sep. 2007. (Accessed Jul. 24, 2014—IEEE)http://ieeexplore.ieee.org/xpl/articleDetails.jsp?arnumber=4343522.
Indukuri, et al. "Natural Language Querying Over Databases Using Cascaded CRFs," Lecture Notes in Computer Science, Sep. 2010, http://www.springerlink.com/content/5w1x27650475304m.
Kolias, et al. "Design and implementation of a VoiceXML-driven wiki application for assistive environments on the web," Personal and Ubiquitous Computing, Sep. 2010. vol. 14, No. 6, p. 527-539,http://www.icsd.aegean.gr/publication.sub.-files/journal/295233664.pdf.
PCT/US2013/042097—International Search Report & Written Opinion dated Dec. 2, 2013.
ATT, "Conversant VIS Version 4.0 Whole Word Bilignual Speech Recognition", Issue 1, Oct. 1993, 86 pgs.
"Contact Center Business Planning Guide", Avaya Inc., 2010, 8 pgs.
"Avaya Self-Service Optimization. Optimize the Performace of your Avaya Self-Service applications", Avaya, Inc., 2011, 4 pgs.
"VoiceXML Tutorial. Developer documentation", Bevocal, Inc., 2005, 68 pgs.
Brick, T, et al. "Incremental Natural Language Parsing for HRI", Journal of the Association for Computing Machinery, Mar. 10-12, 2007, 8 pgs.
Charniak, E., et al. "Edge-Based Best-First Chart Parsing", 1998, 8 pgs.
Crisostomo, A. "Constituents and Phrases", Jul. 2011, 43 pgs.
Copestake, A, et al., "Minimal Recursion Semantics: An Introduction" Research on Language and Computation, vol. 3, pp. 281-332, 2005.
Deobhakta, N., "Natural Language Processing, User Interfaces, and the Semantic Web". Proceedings from the Third Annual HCI Symposium, Dec. 2012, 22 pgs.

(56) References Cited

OTHER PUBLICATIONS

"ECMAScript Language Specification", ECMA-262, ECMA International, 5.1 Edition, Jun. 2011, 258 pgs.
Graham, P., "Parsing with ATNs. On Lisp: Advanced Techniques for Common Lisp", Engelwood Cliffs, NJ, Prentice Hall, 1993, 16 pgs.
McKeown, K., "Semantic Analysis: Syntax-Driven Semantics", 27 pgs. [retrieved Jun. 17, 2014]. Retrieved from the Internet: <URL: <http://www.google.com/url?sa=t&rct=j&q=&esrc=s&source=web&cd=2&ved=0CCEQFjAB&url=http%3A%2F%2Fwww1.cs.columbia.edu%2F~kathy%2FNLP%2FClassSlides%2FClass13SemanticAnalysis%2Fsemantics.opt&ei=Xdb4VMPDIcvsoAS2soGABg&usg=AFQjCNGiXuBWLO-oQB_MLor_kN_8ATdpRg&sig2=BnvJvvJJo3OApAC6ny0guQ&bvm=bv.87611401,d.cGU>>.
Huang, L, et al., "Dynamic Programming for Linear-Time Incremental Parsing". Proceedings of the 48th Annual Meeting of the Association for Computational Linguistics, pp. 1077-1086, Jul. 2010.
Iqbal, R, et al., "A Negation Query Engine for Complex Query Transformations". Journal of Science and Technology, pp. 193-204, 2013.
Klein, D, et al. "Accurate Unlexicalized Parsing", Proceedings of the 41st Meeting of the Association for Computational Linguistics, vol. 1, pp. 423-430, 2003.
Matsubara, S, et al., "Chart-based Parsing and Transfer in Incremental Spoken Language Translation", Proceedings of the Fourth Natural Language Processing Pacific Rim Symposium, 1997, 4 pgs.
Mohri, M, et al., "Weighted Finite-State Transducers in Speech Recognition", Computer Speech and Language, Jan. 2002, 26 pgs.
Murase, T, et al., "Incremental CFG Parsing with Statistical Lexical Dependencies", Proceedings of the Sixth Natural Language Processing Pacific Rim Symposium, Nov. 2001, 9 pgs.
New, B., "Question Answering at TREC", Pre-Internship report, Mar. 2008. 4 pgs.
Nortel Norstar, "Voice Mail Speech Recognition Automated Attendant", Product manual [online]. 29 pgs. Nortel Norstar [retrieved Sep. 4, 2012]. Retrieved from the Internet: <URL: https://downloads.avaya.com/css/P8/documents/100141923>.
Norvell, T., "A Short Introduction to Regular Expressions and Context Free Grammars", Project report, Nov. 2002, 5 pgs.
Quesada, J, et al. "Design of a Natural Language Command Dialogue System". Project deliverable 3.2, SIRIDUS, 2000, 91 pgs.
Seneff, S., "TINA: A Natural Language System for Spoken Language Applications", Journal of the Association for Computational Linguistics, 18 (1), pp. 61-82, Mar. 1992.
Seneff, S, et al., "Galaxy-II: A Reference Architecture for Conversational System Development", Proceedings of the International Conference on Spoken Language Processing, Nov. 1998, 5 pgs.
Stolcke, A., "An Efficient Probabilistic Context-Free Parsing Algorithm that Computes Prefix Probabilities", Journal of the Association for Computational Linguistics, 21 (2), Jun. 1995, pp. 165-201.
"Do you know the true cost of IVR migration?" Datasheet. Aspect Software Incorporated, Dec. 2012, 4 pgs.
Zlatanov, T. "Cultured Perl", Nov. 2004, 13 pgs. [retrieved Oct. 22, 2014]. Retrieved from the Internet: <URL: http://www.ibm.com/developerworks/linux/library/l-cpregex/index.html>.
Younger, D. H., "Recognition and parsing of context-free languages in time n3", Information and Control, vol. 10, Issue 2, Feb. 1967, pp. 189-208.
Guzzino, Didier, "Active: A Unified Platform for Building Intelligent Applications", Jan. 23, 2008, 263 pgs.
"Nuance Recognizer 9.0: Language Pack Guide", Nuance Communications, Inc., 2007, 34 pgs.
PCT/US2009/066458—International Search Report, dated Jun. 23, 2010, 16 pages.
InData Corporation, DepoView Video Review Software Product Description, "InData's Newest Video Deposition Viewer", Dec. 2007, 2 pgs.
InData Corporation, DepoView DVD, Video Review Software Product Brochure, Jun. 2008, 4 Pgs.
InData Corporation, DepoView Video Review Software Product Description, http://indatacorp.com/depoview.html, accessed Nov. 8, 2011, 2 Pgs.
Sony Ericsson's W850i Walkman Phone Now Available in the Middle East. Al-Bawaba News, 2006 Al-Bawaba. Dec. 11, 2006 Factiva, Inc <www.albawaba.com>. 2 pages.
Blackburn, S G., "Content Based Retrieval and Navigation of Music," University of Southampton, Department of Electronics and Computer Science, Faculty of Engineering and Applied Science, Mar. 10, 1999, 41 Pages.
Blackburn, S., et al. "A Tool for Content Based Navigation of Music," University of Southampton, Department of Electronics and Computer Science, Multimedia Research Group, Copyright 1998 ACM 1-58113-036-8/98/0008, pp. 361-368.
Blackburn, S G., "Content Based Retrieval and Navigation of Music Using Melodic Pitch Contours," University of Southampton, Department of Electronics and Computer Science, Faculty of Engineering and Applied Science, Sep. 26, 2000, 136 Pages.
Blackburn, S G. "Search by Humming". University of Southampton, Department of Electronics and Computer Science, Faculty of Engineering, May 8, 1997, 69 Pages.
Hum That Tune, Then Find it on the Web. NPR: Weekend Edition—Saturday, WKSA. Copyright 2006 National Public Radio. Dec. 23, 2006. Factiva, Inc. 2 pages.
Casey, M. A., et al., "Content-Based Music Information Retrieval: Current Directions and Future Challenges". Apr. 2008, vol. 96, No. 4, Copyright 2008 IEEE, Retrieved from IEEE Xplore [retrieved on Dec. 29, 2008 at 18:02], 29 Pages.
Wagstaff, J., "Loose Wire: New Service Identifies Songs You Hum," WSJA Weekend Journal. Copyright 2006, Dow Jones & Company, Inc. Dec. 25, 2006. Factiva, Inc. 2 pages.
Saltzman, M., "The Best Things in life are Free—For Your iPhone," Home Electronics and Technology, For Canwest News Service. Copyright 2008 Edmonton Journal. Nov. 12, 2008. Factiva, Inc. 2 pages.
First Products with Gracenote Technology to Ship in 2008. Warren's Consumer Electronics Daily. Copyright 2007 Warren Publishing, Inc. Sep. 18, 2007 Factiva, Inc. 2 pages.
Gracenote Readies New Services, But Video Initiative Stalls. Warren's Consumer Electronics Daily. Copyright 2005 Warren Publishing, Inc. vol. 5; Issue 122. Jun. 24, 2005. Factiva, Inc. 2 pages.
Furui, S., "Digital Speech Processing, Synthesis, and Recognition". Second Edition, Revised and Expanded. Nov. 17, 2000. ISBN 978-0824704520. 17 pages.
Ghias, A., et al. "Query By Humming," Musical Information Retrieval in an Audio Database, Cornell University 1995, 6 Pages.
Ghias, A., et al. "Query by Humming—Musical Information Retrieval in an Audio Database," ACM Multimedia 95—Electronic Proceedings, San Francisco, CA, Nov. 5-9, 1995, 13 Pages.
Han, B., et al. "M-Musics: Mobile Content-Based Music Retrieval System". Copyright 2007, Augsburg, Bavaria, Germany. ACM 978-1-59593-01-8/07/0009. Sep. 23-28, 2007. pp. 469-470. 2 Pages.
Jang, J.R., et al. "A General Framework of Progressive Filtering and its Application to Query to Singing/Humming"—IEEE Transactions on Audio, Speech, and Language Processing, vol. 16. No. 2, Feb. 2008. pp. 350-358. 9 Pages.
Kosugi, N., et al. "A Practical Query-By-Humming System for a Large Music Database". NTT Laboratories, Japan. ACM Multimedia Los Angeles, Ca, USA Copyright ACM 2000 1-58113-198-4/00/10. pp. 333-342. 10 Pages.
McNab, R. J., et al. "Towards the Digital Music Library: Tune Retrieval from Acoustic Input". University of Waikato, Department of Computer Science, School of Education. DL 1996, Bethesda MD USA. Copyright 1996 ACM 0-89791-830-4/96/03. p. 11-18. 8 Pages.
McNab, R. J., et al. "The New Zealand Digital Library MELody inDEX". University of Waikato, Department of Computer Science. D-Lib Magazine, May 1997 [retrieved on Jun. 12, 2011 at 11:25:49 AM]. ISSN 1082-9873. Retrieved from the Internet: <http://dlib.org/dlib/may97/meldex/05written.html>, 13 pages.

(56) References Cited

OTHER PUBLICATIONS

Pardo, B., et al. "The VocalSearch Music Search Engine". EECS, Northwestern University. JCDL 2008, Pittsburgh, Pennsylvania, USA Jun. 16-20, 2008, ACM 978-1-59593-998-2/08/06. p. 430. 1 Page.

Mobile Music: Comcast Cellular First in U.S. to Trial Breakthrough Interactive Music Service Called *CD. Copyright PR Newswire, New York. ProQuest LLC. Feb. 11, 1999. Retrieved from the Internet: <http://proquest.umi.com.libproxy.mit.edu/pqdwb?did+38884944&sid=3&Fmt=3&clientld=5482&RQT=309&VName=PQD>. 3 pages.

Song, J., et al. "Query by Humming: Matching Humming Query to Polyphonic Audio," LG Electronics, Seoul, Korea. Copyright 2002 IEEE. 0-7809-7304-9/02 pp. 329-332. 4 Pages.

Taylor, C., "Company Lets Listeners Dial for CDs," Billboard, vol. 1, No. 26, General Interest Module, Jun. 26, 1999, pp. 86-87, 2 pages.

"Can't Get That Song Out of Your Head," Copyright 2007, The Jakarta Post, May 20, 2007, Factiva, Inc, 2 Pages.

Typke, R., et al., "A Survey of Music Information Retrieval Systems," Universiteit Utrecht, The Netherlands. Copyright 2005 Queen Mary, University of London. 8 Pages.

Wang, A., "The Shazam Music Recognition Service". Communications of the ACM, vol. 49, No. 8. Aug. 2006. ACM 0001-0782/06/0800. pp. 44-48. 5 pages.

Melodis Rolls Out midomi mobile. Wireless News. Copyright 2008 M2 Communications, Ltd. Mar. 6, 2008. 1 Page.

Zhu, Y., et al. "Warping Indexes with Envelope Transforms for Query by Humming". New York University, New York. SIGMOD Copyright 2003, San Diego, CA. Jun. 9-12, 2003 ACM 1-58113-634-X/03/06. pp. 181-192. 12 Pages.

PCT/US2009/066458—International Preliminary Report on Patentability dated Jun. 7, 2011, 7 pages.

U.S. Appl. No. 60/222,023—Wang, et al., "Method and Apparatus for Recognizing Sound and Music Signals in High Noise and Distortion" filed Jul. 31, 2000, 26 pages.

U.S. Appl. No. 60/134,782—Rhoads, G., "Methods and Systems Employing Digital Watermarking," filed May 19, 1999, 47 pages.

U.S. Appl. No. 60/166,965—Finley, M., et al., "Broadcast Media Purchasing System," filed Nov. 23, 1999, 21 pages.

U.S. Appl. No. 60/158,087—Swierczek, R., "Music Identification System," filed Oct. 7, 1999, 12 pages.

U.S. Appl. No. 60/186,565—Swierczek, R., "Music Identification System," filed Mar. 2, 2000, 14 pages.

Chou, T., et al., "Music Databases: Indexing Techniques and Implementation", Proceedings of International Workshop on Multimedia Database Management Systems, IEEE, dated Aug. 14-16, 1996, pp. 46-53, 8 pages.

McPherson, J.R., et al., "Usage of the MELDEX Digital Music Library", 1999, in Proceedings of the International Symposium on Music Information Retrieval, (Bloomington, IN, USA, 2001), pp. 19-20, 2 pages.

Wold, E., et al., "Classification, Search, and Retrieval of Audio", Muslce Fish, Berkeley, CA, USA, CRC Handbook of Multimedia Computing 1999, pp. 1-19, 18 pages.

Wold, et al., "Content-Based Classification, Search and Retrieval of Audio", IEEE Multimedia 1070-986X/96, vol. 3, No. 3: Fall 1996, pp. 27-36 (17 pages).

Horn, P., "What was that song? With a wireless phone, find out what you heard on the radio," The Inquirer, Philadelphia, Pennsylvania, USA, dated Feb. 11, 1999, 3 pages.

Amdal, et al., "Pronunciation variation modeling in automatic speech recogniction", Teletronikk 99.2, Feb. 2003, pp. 70-82.

Bisani, et al., "Joint-sequence models for grapheme-to-phoneme conversion", Speech Communication 50.5, May 2008, pp. 434-451.

Harrison, et al., "Improving mispronunciation detection and diagnosis of learners' speech with context-sensitive phonological rules bases on language transfer", INTERSPEECH, Sep. 2008, pp. 2787-2790.

Tesprasit, et al., "A context-sensitive homograph disambiguation in Thai text-to-speech synthesis", Proceedings of the 2003 Conference of the North American Chapter of the Association for Computational Linguistics on Human Language Technology: companion volume of hte Proceedings of HLT-NAACL 2003, (2003), pp. 1-3.

Bechet, F., et al., "Large Span statistical models: application to homophone disambiguation for large vocabulary speech recognition in French," Eurospeech, Sep. 1999, p. 1-4.

Choi, J., et al., "On applying phonological rules for a., Korean Continuous Speech Recognition System," Proceedings of ICSP '97, Aug. 1997, pp. 491-496.

Cremelie, et al., "In search of better pronounciation models for speech recognition," Speech Communication 29.2, Nov. 1999, pp. 115-136.

Derouault, A., et al., "Natural language modeling for phoneme-to-text transcription," IEEE Transactions on Pattern Analysis & Machine Intelligence, Nov. 6, 1986, pp. 742-749.

Gravier, G., et al., "Introducing contextual transcription rules in large vocabulary speech recognition," The Integration of Phonetic knowledge in speech technology, Spinger Netherlands, 2005, pp. 87-106.

Holter, T., et al., "Maximum likelihood modelling of pronounciation variation," Speech Communication 29.2, Nov. 1999, pp. 177-191.

Miller, L.G., et al., "Syntactic Analysis for large vocabulary speech recognition using a context-free covering grammar," Acoustics, Speech, and Signal processing, 1988, ICASSP-88, 1988 International Conference on. IEEE, Apr. 1988, pp. 271-274.

Schaden, S., "Rule-based lexical modelling of foreign-accented pronounciation variants," Proceedings of the tenth conference on European chapter of the Association of Computation Linguistics-vol. 2, Association for Computational Linguistics, 2003, pp. 159-162.

Schiel, F., et al., "Statistical modeling of pronunciation: it's not the model, it's the data," Modeling Pronounciation Variation for Automatic Speech Recognition, May 1998, pp. 1-7.

Phillips, W., "Introduction to Natural Language Processing," CCSI 2006 The Mind Project, retrieved online: <http://www.mind.ilstu.edu/curriculum/protothinker/natural_language_processing.php> accessed on Nov. 25, 2016, 24 pages.

Feldman, "NLP Meets the Jabberwocky: Natural Language Processing in Information Retrieval," ONLINE, Information Today, Inc., Copyright May 1999, 16 pages.

Wilcox, B., "Beyond Facade: Pattern Matching for Natural Language Applications," The Gamasutra—The Art & Business of Making Games, Copyright 2016 UBM Tech, retrieved online: <http://gamasutra.com/view/feature/134765/beyond_fa%C3%A7ade_pattern_matching_.php> accessed on Nov. 25, 2016, 14 pages.

De Mareail, Philippe Boula, et al. "A French Phonetic Lexicon with Variants for Speech and Language Processing." LREC. Jun. 2000, pp. 1-4.

Perennou, Guy, et al. "MHATLex: Lexical Resources for Modelling the French Pronunciation." LREC. Jun. 2000, pp. 1-8.

Ranbom, Larissa J., et al. "Lexical representation of phonological variation in spoken word recognition." Journal of Memory and Language 57.2, Aug. 2007, pp. 273-298.

Svendsen, Torbjom. "Pronunciation modeling for speech technology." Proc. Intl. Conf. on Signal Processing and Communication (SPCOM04), Jan. 2005, pp. 1-6.

Young, S. L., et al. "High level knowledge sources in usable speech recognition systems." Communications of the ACM 32.2, Feb. 1989, pp. 183-194.

Gaudinat, Arnaud, et al. "Syntax-based speech recognition: how a syntactic parser can help a recognition system."EuroSpeech. Sep. 1999, pp. 1-4.

Yao, "The Effects of Phonological Neighborhoods in Pronunication Variation in Conversational Speech", UC Berkeley Electroinic Theses and Dissertatioms, Jan. 1, 2011, 218 pages.

Huet, Stephanie, et al., "Morpho-syntactic post-processing of N-best lists for improved French automatic speech recognition", Computer Speech and Language 24.4, Elsevier Ltd., 2010, pp. 663-684, 22 pages. (Cited in Parent).

* cited by examiner

```
<SENTENCE> ::= <STATEMENT>
<STATEMENT> ::= <SUBJECT> <TRANS_VERB> <COMPLEMENT>
<SUBJECT> ::= <NOUN_PHRASE>
<NOUN_PHRASE> ::= <NOUN>
<NOUN> ::= <PROPER_NOUN>
<COMPLEMENT> ::= <NOUN_PHRASE>
...
<PROPER_NOUN> ::= John
<PROPER_NOUN> ::= Mary
<sing><1st><present><TRANS_VERB> ::= likes
<sing><1st><past><TRANS_VERB> ::= liked
...
```

400

USING PHONETIC VARIANTS IN A LOCAL CONTEXT TO IMPROVE NATURAL LANGUAGE UNDERSTANDING

RELATED APPLICATION

This application is a continuation of U.S. application Ser. No. 14/634,642, entitled "Using Phonetic Variants in a Local Context to Improve Natural Language Understanding", filed on Feb. 27, 2015, which claims priority from U.S. Provisional Application No. 61/945,733 filed Feb. 27, 2014 entitled "Phonetic Variants" naming inventors Keyvan Mohajer, Chris Wilson, and Bernard Mont-Reynaud that is related to U.S. Application No. 61/798,526 filed on Mar. 15, 2013, entitled "An Integrated Programming Framework for Speech and Text Understanding", naming inventors Keyvan Mohajer, Seyed Majid Emami, Chris Wilson and Bernard Mont-Reynaud, both applications of which are hereby incorporated by reference.

BACKGROUND

Field

The technology disclosed relates to speech recognition systems, and more particularly to using local overrides of a phonetic dictionary when processing phonetic tokens extracted from a speech utterance.

Related Art

Automatic speech recognition, and speech understanding by computer, have been the object of considerable work in the last several decades. Initial success was quite limited, and people realized early on that speech signals were extremely variable, and that acoustic data alone was not sufficient to transcribe a speech utterance into phonemes or text with any kind of reliability. The key to greater robustness (besides the improvement of each of the individual components of a large system) has been recognized to lie in the integration of many constraints, as many constraints as may be brought to bear on the interpretation of an utterance. Language models are primary sources of constraints for speech recognition, and speech understanding uses semantic models in addition.

A language model provides a means of ranking sequences of words according to the degree of acceptability of each sequence. This may take the form of a yes or a no, with the use of a classic grammar that accepts or rejects sequences of words, or that of a probability of acceptance, with the use of a stochastic grammar, or a statistical language model. Reliable speech recognition and speech understanding systems use language models of one kind or another to constrain the results from acoustic analysis, and the front-end component that creates phoneme hypotheses from the acoustic signal.

A statistical language model (SLM) assigns the probability to a sequence of words, based on training the model using a corpus of text data. A word sequence of length n is called an N-gram. The most useful sequences have length 1, 2, 3, or 4 and are called unigrams, bigrams, trigrams, and quadgrams, respectively. Larger values of N are also considered. A corpus of text documents may be processed to extract every N-gram in the documents and count the number of occurrences of each particular N-gram in the corpus. Deriving probabilities directly from empirical frequency counts results in serious issues when the data is sparse and certain N-grams are missing. A number of smoothing techniques exist to convert the frequency counts to useful probabilities, which become part of the SLM. The SLM then provides a way to determine the probability of a sequence of words according to simple conditional probability formulas.

A classic grammar is a language model that specifies a set of word sequences that are acceptable, and rejects other sequences. Accepted word sequences are called sentences according to the grammar. A word-level grammar, such as a grammar for English, may be used for many different purposes. In a natural language understanding system, it helps identify valid input—be that text or speech utterances. A grammar uses grammar symbols, also called non-terminals, and terminal symbols, which in the case of interest are English words, and it has one or more "start symbols" such as <SENTENCE> which would refer to an entire sentence. The grammar consists of production rules, also called grammar rules, with one or more such rules for each non-terminal symbol. In a context-free grammar, a production rule has a "left hand side" which consists of a single non-terminal symbol, and a "right hand side" which is a sequence of terminal and non-terminal symbols. In a context-sensitive grammar, the "left-hand-side" can have more than one symbol. A grammar may be used to generate valid sentences, but it is usually used as a recognizer of valid sentences. Given a grammar and an input sequence, which in the present case is a sequence of words, the parsing process uses the grammar rules to accept the inputs that the grammar can generate (in which case it creates a parse, which is usually displayed as a parse tree) and it will otherwise reject the input sequence. Many parsing techniques are known in the field.

A stochastic grammar is a grammar that associates a probability with each alternative production rule for a non-terminal. During parsing, these probabilities may be multiplied together to determine the probability of each possible parse tree. For the rest of this disclosure, use of the unqualified term "grammar" will refer to a stochastic grammar. A classic grammar can easily be turned into a stochastic one by assigning default probabilities (e.g., equal probabilities) to the alternative production rules for a non-terminal.

In some implementations, natural language words are the terminal symbols and the grammar has non-terminal symbols such as <NOUN>, <PROPER NOUN>, <PRO-NOUN>, <ADVERB> and many more. We also use the word "pattern" for the right-hand-side of a grammar rule. A pattern may be a sequence of terminal and non-terminal symbols, but more permissive definitions are also commonly used. Regular expressions over the alphabet of non-terminals and terminals are a convenient and well-understood pattern formulation. When required, permissive definitions of patterns (such as extended BNF and other formalisms) can be transformed back to the simple form of context-free grammar described above.

Grammar patterns (the right hand sides of rules) are used to match portions of text or of utterances. Multiple patterns can match parts of a single input text or utterance. In general, the parsing process may produce more than one answer. Some parsers (such as incremental parsers) maintain all parsing options in parallel, pruning the options under consideration parsing proceeds from one word to the next.

A grammar specifies the syntax rules that define a language. A parser based on a grammar will accept word sequences that are syntactically correct, or valid, for the language and rejects sequences that are not. In some implementations, a parser may be created by compiling the grammar into a more efficient form—object code optimized for parsing.

A semantic grammar is a grammar that has been augmented to further specify constraints for sequences of words to make sense, and to create their meaning. For many applications of natural language understanding, a meaningful sentence is one that can be translated into a meaning representation that is actionable. A semantic parser is a parser based on a semantic grammar. A semantic parser accepts well-formed, meaningful word sequences and rejects word sequences that do not make sense as specified by the semantic grammar. A classic example (from linguist Chomsky) is "Green ideas sleep furiously": it is a well-formed (i.e. syntactically correct) sentence, in terms of the structure <ADJECTIVE> <NOUN> <VERB> <ADVERB>, yet the sentence is utterly meaningless because ideas don't have color, ideas don't sleep, and sleeping can't be furious. A more mundane example of relative nonsense is "I will meet you on February 30" which seems perfect until you bring in the fact that February does not have that many days. It may not be actionable (as a calendar commitment) but it still leads to a range of possible answers ("Can you tell me that date again?" etc.) so the boundary between meaningful and not-meaningful can be fuzzy and highly application-dependent.

Words generally have pronunciations defined by a phonetic dictionary, or by word-to-phoneme algorithms. These inventors have recognized special cases of language understanding in which the pronunciation of a word is affected by its context. In a successful parse, be it by a grammar or a semantic grammar, a word is recognized in the context of a production rule, and broadly, of a parse tree. Similarly, when a word is matched with a statistical language model, the word is recognized in the context of one or more N-grams. For these recognition methods, it will be useful to describe a new technology that controls for changes of pronunciation of words as a function of their context in a language model.

SUMMARY

The technology disclosed provides a method of processing an input utterance using production rules that include phonetic variants that are local to a production rule or N-gram, and that override pronunciations provided by global defaults. Other aspects and advantages of the technology disclosed can be seen on review of the drawings, the detailed description and the claims, which follow.

DETAILED DESCRIPTION

The technology disclosed addresses matching a spoken input to a grammar comprising production rules that may include phonetic variants that specify alternative pronunciations of words that apply in the particular context of the rule, herein called local context. A pronunciation is represented by a sequence of phonemes, and a phonetic variant is a phoneme sequence that represents a pronunciation other than the default pronunciation.

In a system that supports both speech input and text input, the disclosed technology also provides matching textual input to a grammar comprising production rules that include alternate spellings of words within a local context; some of the words may have no valid pronunciation. The use of semantic constraints is optional for this disclosed technology, as is the use of an incremental parser. A technology similar to that used for grammars is described for statistical language models.

The technology disclosed in this document provides a convenient and elegant way to introduce subtleties in phoneme-to-word mapping, on an as-needed basis, and in the syntactic/semantic context where they are needed. Applying this technology, the problem of mapping phonemes to words using a grammar where the pronunciation of some words is affected by their syntactic or semantic context, can be solved by adding to a word-level grammar the capability of specifying at least one local word phonetic variant (i.e., alternate pronunciation) of the word, that applies in the local context of the specific production rule.

The word "score" is a measure of acceptability. "Score" is defined herein as a numerical indication of the likelihood or probability that the scored sequence is the correct transcription of the speech, interpretation of the text, or both. The higher the score, the more likely the sequence is what the user intended. "Weight" may be a numerical value associated with the application of production rules. For example, the weight assigned to alternate production rules may be used to determine the score of a parse tree according to the production rules.

A detailed description of implementations of the technology disclosed is provided with reference to the FIGS. 1-8.

Figure 1:
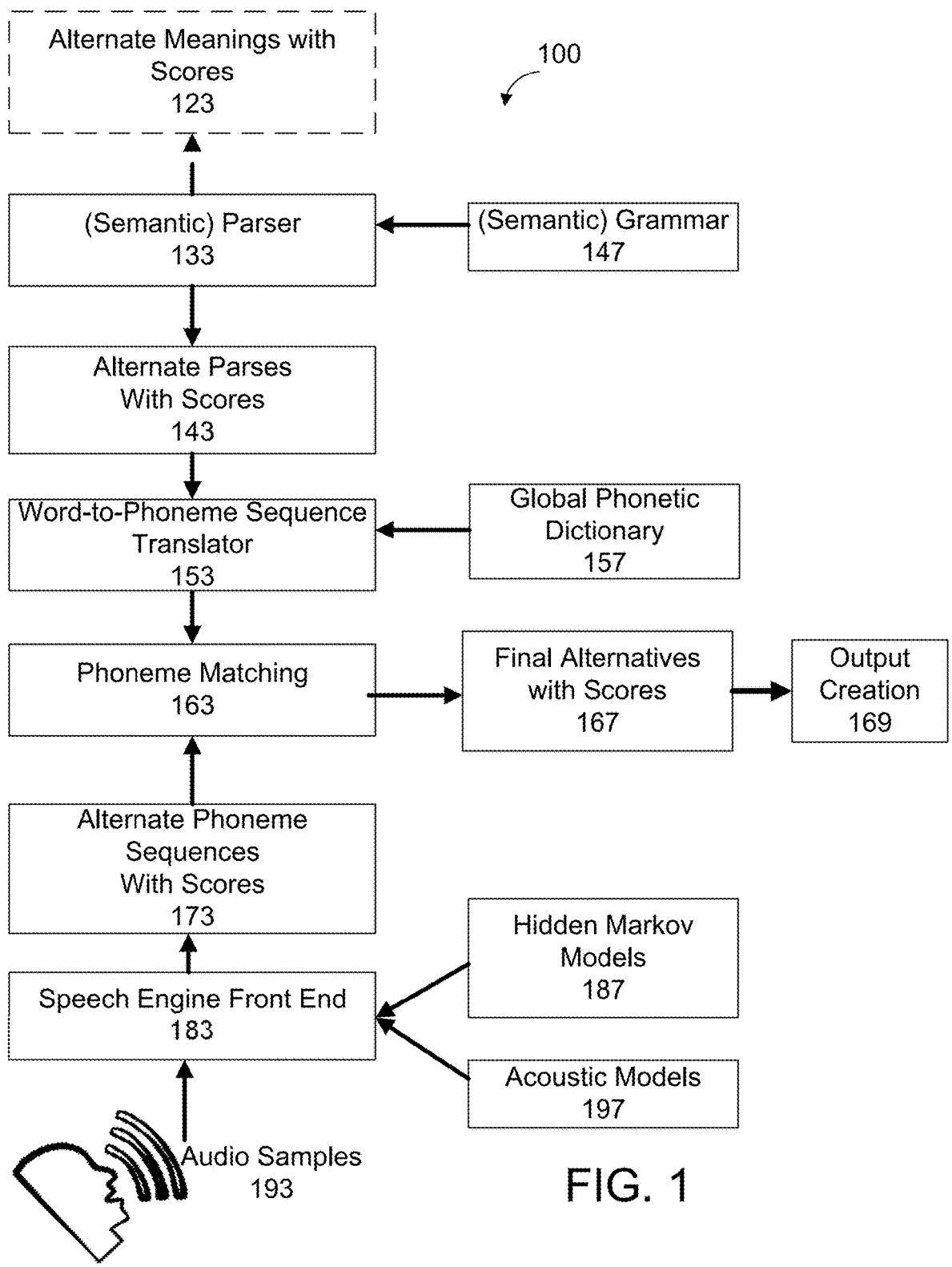
FIG. 1 is a block diagram that illustrates an embodiment of the interaction between acoustic and language models for natural language understanding (NLU), according to an implementation.

FIG. 1 is a block diagram that illustrates an embodiment of the interaction between acoustic and language models for natural language understanding (NLU). In flow 100, when a person speaks, Audio Samples 193 are input into Speech Engine Front-end 183. Speech engine front-end 183 processes acoustic features of audio samples 193 using one or more Acoustic Models 197, and using Hidden Markov Model 187, generates one or more phoneme sequences, each sequence associated with a score indicating the probability that the sequence is the most likely intended sequence. For example, a speaker may say, "I read a good book." Table 1 shows example Alternate Phoneme Sequences with Scores 173 that might be generated by speech engine front-end 183. The phoneme sequences are represented using the phoneme set CMUP (CMU Phoneme Set) for purposes of illustration (shown in Appendix I), but any phonetic representation may be used.

TABLE 1

Phoneme sequences generated by Speech Engine Front End

| Phoneme Sequence | Score |
|---|---|
| AY + R EH D + AH + G EH D + B UH K | 0.000073034 |
| AY + R EH D + AH + G UH D + B UH K | 0.000083907 |
| AH + R EH D + AH + G UH D + B UH K | 0.000088087 |

As seen in Table 1, certain phonemes are bolded to call attention to the differences between these three very similar phonetic sequences. The third alternative phoneme sequence has the highest acoustic score.

Figure 2:
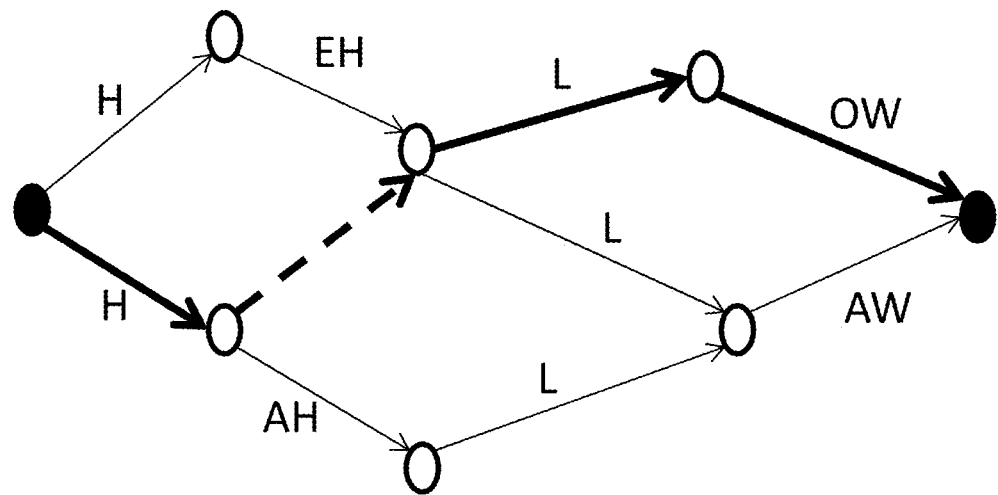
FIG. 2 is an example of a phoneme lattice, according to an implementation.

In another implementation, a phoneme lattice such as illustrated in FIG. 2 may be produced by the speech engine front-end 183 as a compact representation of the alternate phoneme sequences. The phoneme lattice shown in FIG. 2 is represented using the CMUP. Scores may also be attached to phoneme lattices, although they are not shown in FIG. 2.

"(Semantic)" appears within parenthesis in the drawings to indicate that the use of semantic augments is optional for the technology disclosed. In a purely syntactic implementation, the grammar used to recognize valid word sequences may accept word sequences that are syntactically correct, but it will not reject word sequences that make no sense; the corresponding parser is not a semantic parser. In another implementation, a semantic grammar is used, and the parser based on this grammar may only recognize meaningful word sequences; such a semantic parser not only parses the syntax of the word sequence (which may build a parse tree) but also creates a representation of its meaning. In most applications, a word sequence is considered "meaningful" if an actionable meaning representation may be built from it.

In FIG. 1, grammar 147 is a stochastic grammar. That is, each of the alternative productions associated with a specific non-terminal symbol are assigned a non-negative weight. In a typical implementation, the weights associated with a specific non-terminal are normalized so that the sum of weights for each non-terminal is equal to 1. In an implementation, the score of a parse tree for a particular word sequence is the product of the normalized weights associated with all of the production rules that are used in the parse tree that recognizes the word sequence. (This description applies to simple BNF rules, devoid of meta-symbols; when production rules are expressed in a richer format, such as regular expression patterns which may involve alternation, iteration or optional components, additional methods are invoked to specify weights in such a way as to return to the basic BNF format.) It is important to note that in general, multiple parses may exist for the same word sequence; that is, these different parses may have different scores, although they generate the same word sequence.

As a result of the scoring process just described, or some variation thereof, the (Semantic) Parser 133 may generate Alternate Parses With Scores 143. As we will discuss later, these parses may not be complete parses for a complete utterance, but partial parses built during incremental parsing. When grammar 147 is a semantic grammar, the syntactic weights or probabilities may be adjusted according to additional rules of a more semantic nature. For example, in a context where the mention of a movie star is expected, the score of the phrase conveying the identity of the actor or actress could be adjusted by a multiplicative factor positively related to the movie star's popularity. Such a score adjustment may result in giving a greater chance of matching a voice query with popular actors, over little known ones. Another example of semantic score adjustment involves geographic names, where nearby cities and large cities may be given a score boost relative to cities that are distant or small.

Whether the grammar is semantic or not, weights or probabilities are derived by the (semantic) parser 133 and associated with alternate parses. A "final" or "overall" score for each alternate parse is determined, based on the score assigned by the (semantic) parser 133, and the score assigned by the Phoneme Matching Module 163. The score may be used as an indication of the likelihood that each alternative parse is the parse intended by the input utterance. In an implementation, scores are combined by multiplication; this often causes problems with dynamic range. In many implementations, scores are kept in logarithmic form, and a multiplicative effect is obtained by an addition. In another implementation, scores may be combined by other means, such as linear combinations. The phoneme matching module 163 may output the overall (final) score along with the meaning representation, if there is one; the word sequence; and the corresponding phoneme sequence that matches a phoneme sequence in 173. Final Alternatives with Scores 167 represents the output of the matching module 163. Further processing may take place on the final alternatives; for example, the output may be sent directly back to the client device, the alternatives may be ranked by final score and the highest ranked alternative sent back to the client device, or the high ranked alternative may be subject to further processing such as determining an action to perform based on the data in the selected alternative data structures.

The (semantic) parser 133 may depend on one or more language models. (Semantic) stochastic grammar 147 is used in the implementation described in FIG. 1; however, in other implementations, statistical language models (based on N-grams) may be used. In some implementations, N-grams may be used over certain parts of an utterance, in conjunction with a stochastic grammar that recognizes different parts of the utterance, resulting in a hybrid technique for assigning scores.

Figures 4A, 4B:
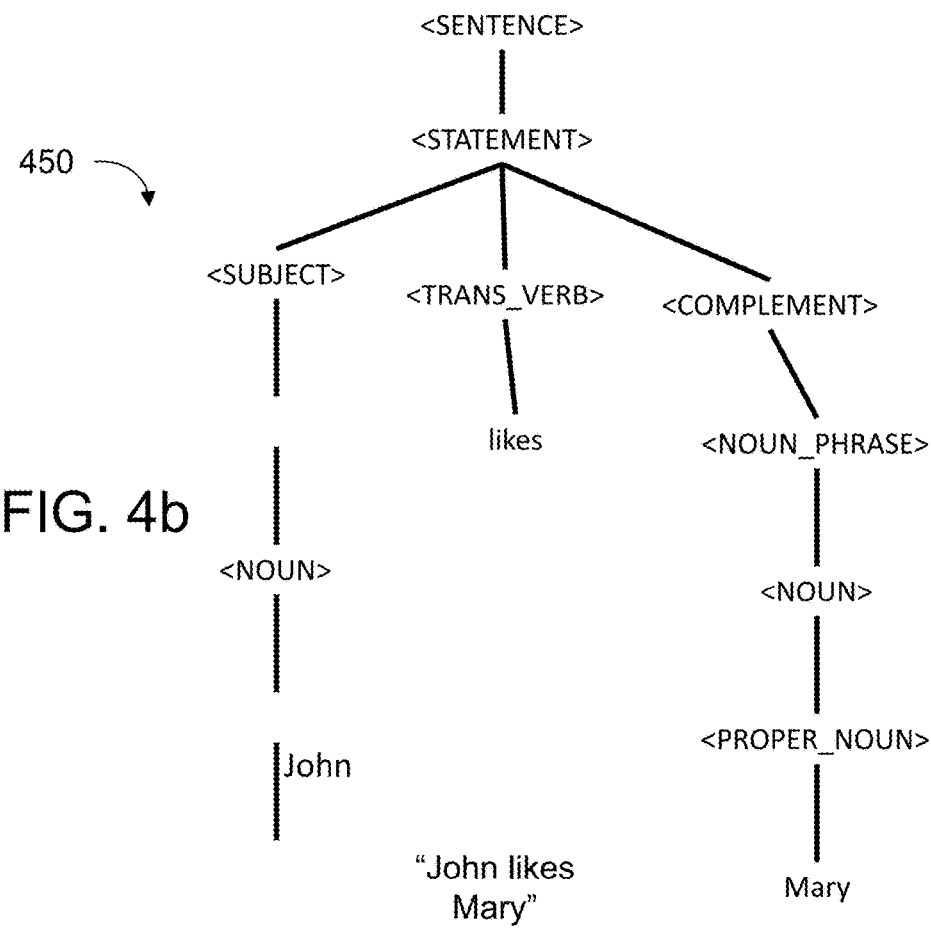
FIG. 4a is an example of a grammar, according to an implementation.
FIG. 4b is an example of a parse tree, according to an implementation.

The manner in which (semantic) parser 133 generates the alternate parses with scores 143 depends on the parsing technique involved. Many implementations are possible, including traditional top-down and bottom-up parsers. However, it may be observed that neither pure top-down nor pure bottom-up techniques are ideal for word sequence generation, due notably to efficiency issues. With the goal of bringing all the acoustic, syntactic and semantic constraints together, on an ongoing basis, an incremental parser is the preferred embodiment. An incremental parser operates "from left to right" or strictly with the passage of time. Parsing words incrementally means advancing one word at a time. The distinguishing characteristic of an incremental parser is that all the alternate parses are maintained in parallel. Some of them die, and some of them multiply as new words appear. Note that the parses that are discussed here are not complete parses (as shown in FIG. 4b) but partial parses, based on the production rules that have already been used until then. In a practical implementation, an incremental parser may only maintain the P highest scoring parses. Each time a word is considered as an addition to a current parse. When the next word is recognized by the language model as a valid next word in the parse, the next word may be added to the parse, the parse score updated based on adding the word, and parsing continues. Otherwise, if the next word is not recognized as a valid next word, the parse may be eliminated. In this manner, the set of alternate parses 143 is maintained dynamically while successive words are tentatively recognized.

Figure 3:
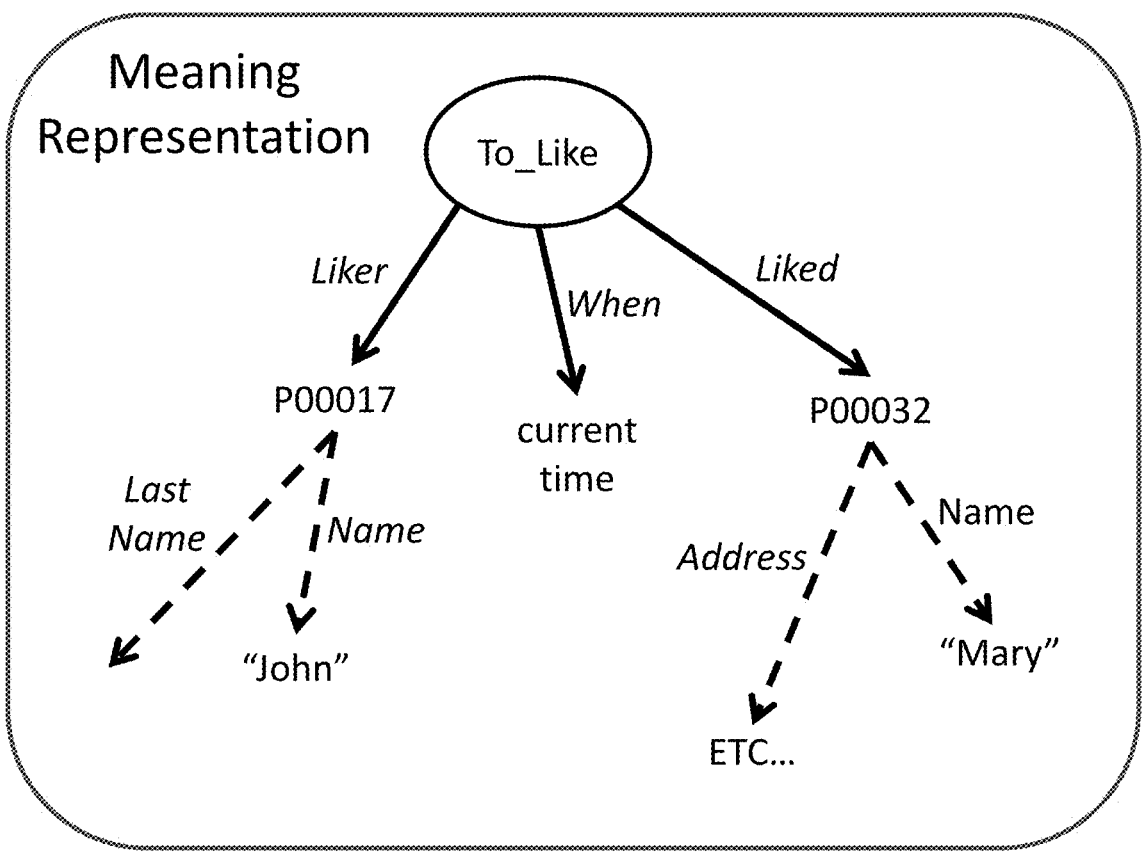
FIG. 3 provides a simple example of a meaning representation, according to an implementation.

A parser using a semantic grammar also generates Alternate Meanings with Scores 123 when parsing an input utterance; as explained earlier, this has the double effect of rejecting meaningless parses, and of using meanings to adjust the scores of the parses. The dashed box indicates that 123 is optional; it only exists when a semantic grammar is used. In such a case, a word sequence in 143 may have a corresponding meaning representation, and this meaning representation may contribute to the score of the parse. FIG. 3 shows a simple example of a meaning representation, according to an implementation.

As an example of parsing, consider the sentence "John likes Mary."

In order to parse this input, consider the sample grammar shown in FIG. 4a—which amounts to a very small subset of a real grammar for English; it is just sufficient to parse the sample utterance. It shows that a <SENTENCE> can be a <STATEMENT> (as opposed to, say, a question or an exclamation, which are not shown) and that a <STATEMENT> can take the form of a subject followed by a transitive verb followed by a complement, and so on. Note that most of the production rules are context-free (they have a single grammatical symbol on the left side of the rule) however the last two rules are context-sensitive: the use of additional symbols on the left permits the conjugation of verbs based on singular/plural, $1^{st}/2^{nd}/3^{rd}$ person, and tense; the list could be made longer. Also note that this is an exemplary embodiment based on using a very simplified approach to grammar; a real-life grammar looks much different. In particular, proper nouns would more likely be found in a dictionary or thesaurus than in grammar rules; and the handling of context-sensitive parts of a language such as noun-verb agreement and verb conjugation would be much more elaborate and perhaps done by other means than those shown.

The example grammar 400 is given as a simple illustration of how a parse tree 450, such as shown in FIG. 4b uses the grammar 400 to generate the target sentence "John likes Mary."

When a semantic grammar is used, every recognized phrase will be assigned a meaning representation in the course of parsing. The example "John likes Mary" may be used to illustrate this next step. In an exemplary embodiment, the proper name "John" is a recognized phrase according to the rules for proper names. The meaning of "John" can be resolved by finding who the particular "John" refers to. A co-reference resolution module (not shown or discussed further here) would resolve "John," in the context of a dialog in progress, to be a specific person, say, the one whose full name is "John M. Smith Jr." and who is known to the system as the entity Person00017. The meaning representation for the phrase "John" will be the entity Person00017 because this is the semantic handle that gives access to all of the information known about this particular John. Similarly, assume that the meaning representation of the recognized phrase "Mary" is the entity known to the system as Person00032. The derivation of "John" from <SUBJECT> takes four steps, but the meaning representation remains; that is, the subject's meaning representation is still the entity Person00017. In four similar steps, the complement's meaning representation is found to be the entity Person00032, whom we know as Mary. Subsequently, the phrase "John likes Mary" is parsed into a <STATEMENT> according to the transitive structure <SUBJECT>, <TRANS VERB>, <COMPLEMENT> found in the grammar 400. In an exemplary embodiment, the meaning representation of a sentence is built around what is called a frame, a data structure with named slots, which may be filled in or not. In an embodiment, the verb "likes" instantiates the verb frame "To Like" and the instance is populated as follows: the tense slot is the "present tense"; the Liker slot is Person00017, whom we know as John, and who has many other properties as suggested by dotted lines; and the Liked slot is Person00032, known as Mary, and who also may have many more associated properties. This gives a simple example of, and a brief introduction to meaning representations; as noted earlier, such representations and the associated scores may play a role in embodiments that use a semantic grammar, but they are not essential to the core elements of the technology disclosed.

The ability to construct a meaning representation for a user's utterance allows an application to take action in response to the utterance. For a simple example, a voice-enabled calculator program that receives the utterance "What is two plus five?" can not only parse the question, but demonstrate an understanding of it by constructing a meaning representation sufficient to derive the correct answer.

Word-to-phoneme Sequence Translation Module 153 translates one or more of the alternate parses with scores 143 into a sequence of phonemes that comprise a pronunciation for the word sequence. The word-to-phoneme sequence translation module 153 ("translator") operates a word at a time; for each word it determines one or more pronunciations for the word. In an implementation, weights are used when there is more than one pronunciation. Weights are specified in a table such as Table 2 below. In an implementation, any unspecified weights in the table are assumed to be 1. The specified weights are normalized before their use, so that their sum is 1. For example, both pronunciations of "read" ((R IY D)|(R EH D)) will receive normalized weights of 0.5; and the three pronunciations of "good" ((3 G UH D)|(G AH D)|(G IH D)) will receive respective normalized weights of 0.6, 0.2 and 0.2 for any subsequent processing.

The one or more pronunciations obtained from the Global Phonetic Dictionary 157 come from an actual entry for the word in a stored table, such as Table 2 (below) or from the results of a "phonetic algorithm" that computes word pronunciations for a given language. In an implementation, the phonetic algorithm is trained over a large corpus of words for the target language or domain, and weights are derived from frequency counts.

In the rest of the disclosure, what is called "Phonetic Dictionary" is effectively a combination of a phonetic dictionary proper and a phonetic algorithm; the distinction is an implementation detail. What is more important is that alternative pronunciations of a word receive weights akin to probabilities, and that the Phonetic Dictionary is global, in the sense that it applies equally to any and all uses of the word. The Global Phonetic Dictionary does not allow pronunciations to be selected based on the local context of a production rule. When the local context allows the specification of phonetic variants, they too may include one or more pronunciations, with weights that are normalized before any subsequent processing.

Translator 153 may look up each word in turn in the Phonetic Dictionary 157, obtain one or more pronunciations for the word, and for each such pronunciation, extend all of the current phoneme sequences with the word's pronunciation. Implementing such a scheme with unstructured sets of sequences becomes computationally unwieldy. In an implementation, phoneme sequences are represented by phoneme lattices, reducing the size of the data structure. In a preferred implementation, word sequences are never considered in their entirely, but only extended by one word in the context of incremental parsing; this technique is explained elsewhere.

Table 2 shows example entries in the phonetic dictionary 157. For example, the first word in the sequence "I read a book", "I" maps to the phoneme sequence (AY). The verb "read" has two pronunciations of equal weight, (R IY D) and (R EH D), each used in different grammatical situations. An alternative way to specify pronunciations without using a phonetic alphabet is to use words with unambiguous pronunciations, such as, in this case, ("reed") and ("red"). Here, the words are used not for their meanings, but for how they sound. Alternate pronunciations may be included in the dictionary for looking for a word that has a pronunciation derived from speech input. For example, if the speech input includes the word read in the past tense (R-EH-D), this alternative pronunciation may be matched in the dictionary to return the word "read".

TABLE 2

Example Phonetic Dictionary

| Word | Pronunciation |
|---|---|
| I | AY |
| read | R IY D  \|  R EH D |
| a | AH  \|  EY |
| the | DH AH  \|  DH IY |
| red | R EH D |
| good | 3 G UH D  \| |
|  | G AH D  \| |
|  | G IH D |
| book | B UH K |
| cough | 3 K AO F |
|  | K AA F |

When transcribing word sequences into phoneme sequences using the phonetic dictionary, there is no contextual information that helps select a pronunciation among multiple alternatives. Relying on local context, when available, is usually more reliable. The set of phoneme sequences generated by translator 153 is a data structure available as input to phoneme matching module 163. In the preferred implementation, which represents a substantial gain in space, the set of phoneme sequences is compressed into a phoneme lattice. In addition, transition probabilities are assigned to every edge coming out of a node, and the resulting node probabilities are assigned to every node. There are less optimal implementations.

The matching module matches a phoneme sequence from translator 153 with a phoneme sequence from the set of scored alternate phoneme sequences with scores 173. For each matching sequence, the bottom-up and top-down scores associated with each of the matching phoneme positions in the sequence are combined to help determine an overall score for the sequence. In one implementation, the combined scores assigned to each position in the sequence are further combined by multiplication across the sequence to determine an overall score. As with all multiplicative processing, the use of scores in the logarithm domain replaces multiplications with additions, which helps to deal with dynamic range issues. Alternative combination rules may be used.

Figure 5:
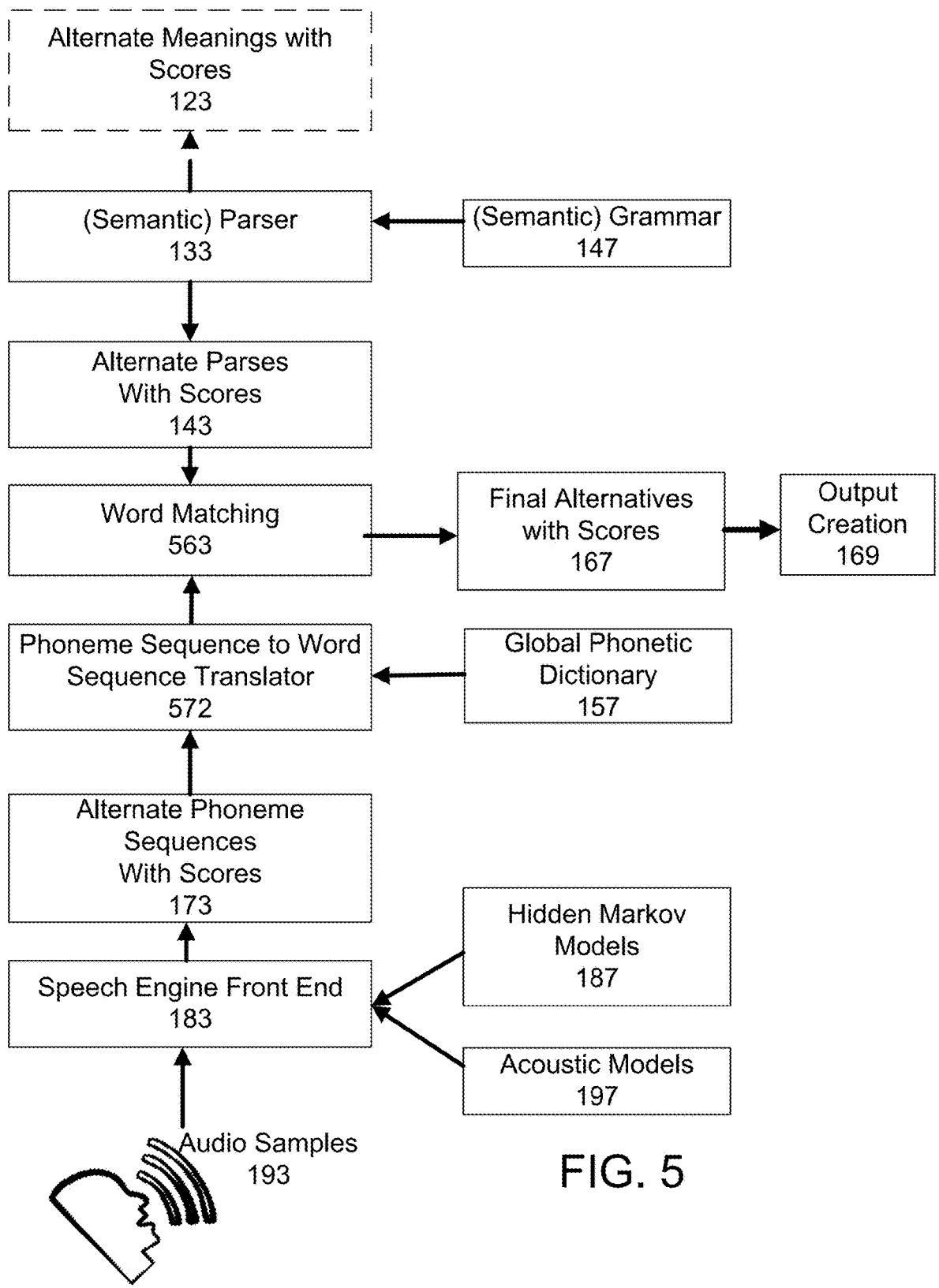
FIG. 5 is a block diagram that illustrates a bottom-up flow that is similar to the top-down flow illustrated in FIG. 1, according to an implementation.

In the discussion of FIG. 1, phoneme matching module 163 matches phoneme sequences. This corresponds to a top-down approach to the word-to-phoneme boundary. There is an alternative bottom-up approach, in which the sequence matches occur at the level of words. FIG. 5 is a block diagram that illustrates a bottom-up flow that is extremely similar to the flow illustrated in FIG. 1, according to an implementation. Instead of using the word-to-phoneme translator 153, the bottom-up approach uses instead a Phoneme Sequence to Word Sequence Translator 172 that relies on the phonetic dictionary, used backwards, to lookup phoneme sequences and translates them to matching word sequences. In other words, the act of finding a pronunciation in the dictionary triggers the addition of a word to the word sequence. The resulting scored word sequences may then be matched in Word Matching 563 against the alternate parses with scores 143.

A phonetic dictionary may naturally include multiple words having the same pronunciation but different meanings. When looking up a phoneme sequence, there may be multiple words that match. In an implementation, a weight may be assigned to each phoneme sequence to word mapping. A word sequence including one of the multiple words may be scored using the weighting assigned to the mapping. The phonetic dictionary 157 may be specific to a subject domain and specific to a vertical application, and the weights assigned to homonyms may be affected by the subject matter. For example, when transcribing an utterance pronounced (R EH D), a library application may assign the word "read" a greater weight than the word "red," but an art application may assign a greater weight to "red" than "read." Using the example phonetic dictionary, the input phonetic sequence may cause a Phoneme Sequence to Word Sequence Translator 572 to generate word sequences with scores as input to the word matching module 563. The word sequences in our example may comprise two sequences of words: "I read a good book" and "I red a good book." A score may be assigned to each transcribed alternate word sequence based on the score of the corresponding alternate phoneme sequences (e.g., 0.000083907 from Table 2). In an implementation, weights may be associated with the words "read" and "red" for the same pronunciation. However, weights in the static global dictionary cannot indicate that "I red a good book" is unlikely to be correct because a color is a noun, not a verb. Effectively, a weight-based approach is weak in comparison with a language model, especially if a grammar and semantics are available. A grammar will usually choose between "read" and "red" without difficulty. In the absence of language models, an implementation may fall back to using weights, which in fact are very much like 1-grams.

The bottom-up approach just described is not the preferred embodiment when top-down constraints are available from a language model and possibly from semantics. In the absence of any top-down constraints, the bottom-up approach is the only viable one; but such systems are rather brittle. Modern, reliable implementations need language models and focus on a top-down approach to the word-to-phoneme boundary.

Dual Modes

Figure 6:
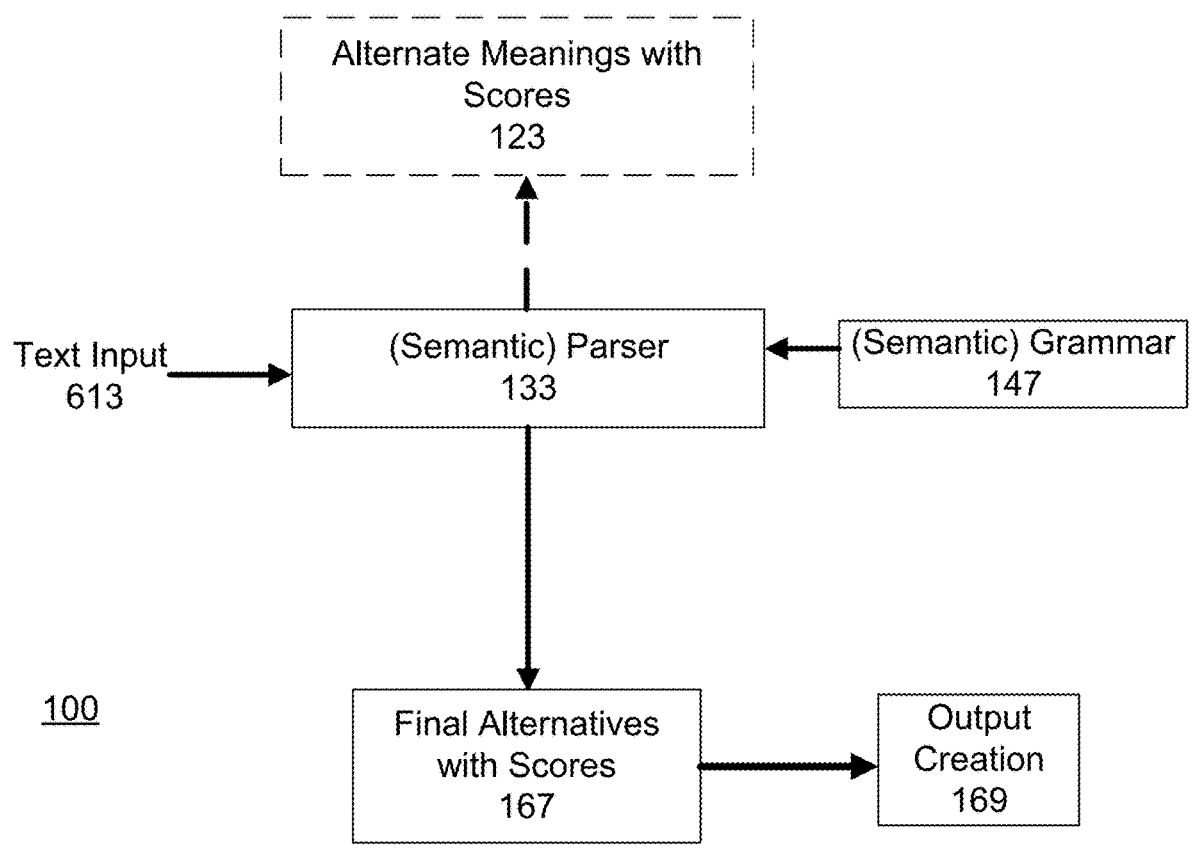
FIG. 6 is a block diagram that illustrates the flow when the system receives text input, according to an implementation.

The disclosed system has dual applications to recognition, referred to as "text mode" and "speech mode" depending on which type of input is being used. FIG. 6 is a block diagram that illustrates the flow when the system receives Text Input 613, according to an implementation. Text input 613 is presented to the (semantic) parser 133. No matching with acoustic data is required in this case, so the alternate parses with scores 143, that were the output of (semantic) parser 133, become input to Final Alternatives with Scores without further processing. In other words, the score for each parse alternative is a final score. The final alternatives with scores 167 comprises the alternative parses recognized by the parser and the optional corresponding meaning representations. An Output Creation module 169 may create a response to the user based on the final alternatives 167. The alternative parses may be ranked based on the final scores. In an implementation, the highest ranked parse may be used to create a multi-media answer. Some parts of the answer may be sent to a speech synthesis module, possibly running on the client device, and the generated speech may be played on the client device. Other parts of the answer may be displayed as text or graphics or video. In an implementation, a meaning representation corresponding to the highest ranked parse may be used to determine an action to take in response to the input text, which action may be executed on the client or servers or both. For example, if the query asks a question, the meaning of the highest ranked alternative may be used to answer the question. Another option is that when multiple alternatives are difficult to distinguish, a system might ask for a clarification. There are additional options in output creation and dialog management that fall outside the scope of the technology disclosed.

Statistical Model for Scoring Word Sequences

In an implementation in which the parser 133 relies on a statistical language model, an input word sequence may be matched against the set of N-grams, and the input word sequence may be assigned a score based on the score associated with the matching N-gram. In an implementation, the score assigned an N-gram may be based on the probability of matching the N-gram within the entire corpus, which is based on the frequency of the N-gram within the corpus.

Phonetic Variants

For this disclosure we focus on the pronunciation of words. For example, in the sentences "Yesterday, I read a book" and "I plan to read a book", the word "read" is pronounced differently. The phonetic dictionary example in Table 2 has a default pronunciation for the word "read." A more accurate assignment of scores would favor the pronunciation (R EH D) in a sentence in the past tense, (R IY D) in a sentence in the present tense or infinitive.

Therefore, there is a need for a method to improve the reliability of natural language recognition and understanding by taking into account the context-dependent subtleties of pronunciation of words in a grammatical (and optionally semantic) context, without excessive cost or complexity in defining the language model. In an implementation, the language model may be extended so that an application developer may specify a correct pronunciation for a word based on the context of the production rule or N-Gram. The pronunciation may be specified using a phonetic alphabet or may be specified by a word in the phonetic dictionary to indicate that the default pronunciation of the word should be used. For example, the phonetic dictionary may provide a pronunciation (R AA2 F AY0 EH1 L) having 3 syllables with the last syllable stressed for the name "Raphael." However, a production rule for the city of San Raphael in Northern California may specify a different pronunciation when "Raphael" is used in the city name:

<CALIFORNIA_CITIES>::=San Rafael (R AA0 F EH1 L)

This rule indicates that the most common pronunciation for "Rafael" in the town name "San Rafael" has two syllables, with the second syllable stressed (in a more informal way to convey phonetics, this sounds like rah-FELL). Specifying this pronunciation in the context of <CALIFORNIA_CI-TIES> indicates that the specified pronunciation should be used rather than using the default pronunciation from the phonetic dictionary.

Similarly, the syntax for specifying N-grams may be extended to supply a pronunciation within the context of the particular word sequence such as for the tri-gram:

San Raphael (R AA0 F EH1 L) California

A similar syntax is suggested here for N-grams and for grammar patterns, that is, for the right-hand-sides of grammar production rules. The rule is that any occurrence of a word may be optionally followed by a pronunciation, between parentheses. In these examples, the CMU phoneme set, CMUP, is used by default, but alternative phoneme sets could be used instead. In another implementation, a more explicit pronunciation notation would be required, such as (CMUP: R AA0 F EH1 L) which makes the choice of the phonetic alphabet more visible.

Many alternative syntactic forms can be used to describe phonetic variants. The grammar pattern used above appears as follows in the Terrier system:

"San". "Raphael" ("CMUP: R AA0 F EH1 L")

In this case, because the syntax is embedded in C++, terminals (words) must be treated as quoted strings; the dot is used as a concatenation operator. There is no dot between a word and its pronunciation.

In addition, the alternative syntactic forms may support assigning weights to alternative pronunciations within a pattern. The following example is syntax from the Terrier system which is (specified informally as):

<recognized word> ([weight1] pronunciation1\[weight2] pronunciation 2)

The example shows how to recognize "AAA":

"AAA" ((10 "triple a.") "CMUP: EY EY EY")

A first pronunciation having a weight of 10, "triple a.", is pronounced as the default pronunciation of "triple" followed by the default pronunciation of the word "a." The second pronunciation is specified using the CMUP phonetic alphabet as "EY EY EY". The second pronunciation may also be specified as "a.a.a"; however, "a.a.a" may indicate a slightly different pronunciation than "EY EY EY". The first difference between "CMUP: EY EY EY" and "a. a. a." is that the former does not allow speech fillers (pause, noise, etc.) between consecutive phonemes, which may be the desired behavior. The second difference is that with phoneme sequences we can specify more precise pronunciations rather than giving guidance to the engine to automatically generate pronunciations. The weight of the second pronunciation is not specified and is assumed to be 1. Thus, this rule indicates that a person is 10 times more likely to say "triple a" than "EY EY EY" when they mean "AAA".

Systems designed for speech understanding should also be capable of text understanding. The latter is essentially an easier task, being generally a sub-task of speech understanding. Looking closer, the set of valid textual inputs mostly overlaps the set of valid transcriptions of speech inputs, but the two sets are not identical. One expects an ideal system to exhibit a very high ratio of reuse (or sharing) of the text understanding components, such as a (semantic) parser, within a speech understanding system, but this will not be 100%. Some word sequences that are valid in "text mode" are not reflected by a spoken utterance. For example, written abbreviations and short-hand notations such as "Jr.", "Sr.", "Dr." do not match an utterance indicating the full words they represent such as such as "junior", "senior", "doctor", etc. Conversely, certain sound forms acceptable in "speech mode" (such as the phrases "uh", "ahem", "like", "you know what I mean", etc. which are "fillers") are not commonly seen, and not welcome in written text. Some implementations provide special handling of fillers in speech mode, in order to diminish their effects.

There is a need for a method to simultaneously support text understanding and speech understanding, with a maximal overlap and economy of specification, to benefit from all that natural language text and natural language speech have in common. This said, it is also important to allow developers of a hybrid natural language understanding system to provide individual support for "text-mode-only" and "speech-mode-only" recognition.

This includes notably the ability to specify that certain words can be written but not pronounced. To exclude a pattern from appearing in spoken form we can use the syntax (not spoken) as in the following example. To understand its effect, compare the following two patterns expressed in the Terrier pattern notation:

1 ("highway"|1/10 "hwy" ("highway"))
2 ("highway"|1/10 "hwy" (not spoken))

Pattern #2, in text mode, recognizes both "highway" and "hwy"; the user can type in either form. But the "pronunciation" (not spoken) is a way to specify an empty set of pronunciations. Hence, a user can say "highway" and the word "highway" may be recognized, but "hwy" will not be matched and appear in a parse tree or a transcription. Using pattern #1, the user may type either "highway" or "hwy". The entered text will be processed in the same way as for pattern #1: both "highway" and "hwy" are recognized but only one of them will be recognized in any single input text, and only one parse will be generated. In speech mode, however, if a user says "highway", both words "highway" and "hwy" will be matched. This ambiguity creates a split among hypotheses and multiplies by two the number of parses to be considered. This behavior results in a systematic source of inefficiency for the entire system. Thus, the use of (not spoken) is advantageous when providing simultaneous support for text mode and speech mode natural language processing.

Phonetic Variants when Using N-Grams

A possible syntax for expressing phonetic variants when using a statistical language model was introduced earlier. The idea is that each word in an N-gram may be optionally followed by a pronunciation. The phonetic become available in the specific context (or "local context") of this N-gram.

For a simple example, consider the bi-grams "Sahara desert" and "must desert" for which variant pronunciations of the heteronym "desert" can be specified (say, using the CMUP phone set) as follows: "Sahara desert (D EH1 Z ER0 T)" and "must desert (D IH0 Z ER1 T)". Simple examples of this type reflect distinct stress patterns found in noun-vs-verb homonym pairs. In another embodiment, identifying parts of speech could contribute to the goal of finding phonetic variants, by way of a lexicon that specifies separately the pronunciation of "desert" as a noun and as a verb. But there are other cases of phonetic variation not covered under the parts-of-speech distinction.

In general, knowledge of the grammatical context offers a more efficient and elegant way to deal with phonetic variants. Variant pronunciations may be specified at a very low (literal) level of a lexicalized grammar, or at a higher level of the grammar. The word "desert" has one pronunciation when used in a noun group (in a nominal context), and another when used in a verb group (in a verbal context). There are other situations that also call for phonetic variants within a specified grammatical context. Examples with a possible syntax for adding phonetic variants in context-sensitive grammar productions, are given below.

Figure 7:
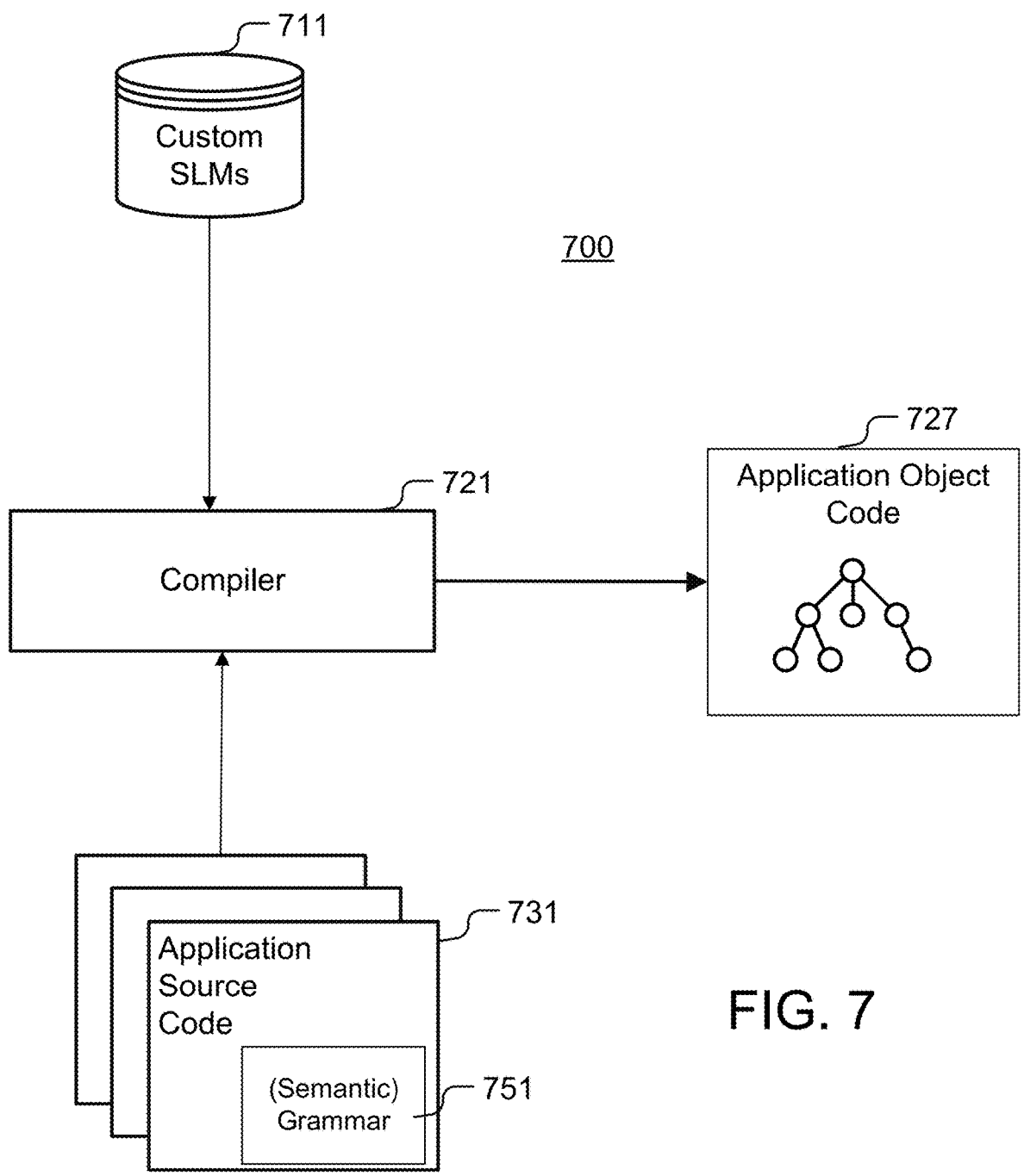
FIG. 7 illustrates a block diagram of an example development environment in which applications may be developed for custom natural language understanding, according to an implementation.

FIG. 7 illustrates a block diagram of an example Development Environment 700 in which custom natural language understanding (NLU) applications may be developed. A NLU application is comprised of application-specific functionality including pattern recognizers and possible actions. Application-specific language models (such as grammars or SLMs) describe patterns that may be mapped to the corresponding actions. Recognizing patterns and performing actions depend both on application code and on general purpose routines; the latter may be collected, for example, in a runtime library.

In one implementation, application source code 731 may be written largely in a general-purpose programming language; however the description of patterns, such as a grammar 751, typically requires constructs the lie outside the general-purpose capabilities of a programming language. In one implementation, actions (which are based on semantic interpretations) are created by a semantic grammar 751 in response to having matched a grammar pattern. In one implementation, a parser for the (semantic) grammar may be generated at development time by a compiler 721. The complier takes as input the grammar and/or N-grams, other application source code 731 and associated data files.

The precise relationship between the natural language parser that will execute at runtime and the application code depends on the application build process. In one implementation, parsing is largely the responsibility of a runtime library, driven by some tables. In another implementation, the parser and grammar (and/or SLM) may be compiled into a tightly coupled and highly optimized object format. A person skilled in the art would understand how to produce a parser of one kind or another, based on the language models specified in application code and any associated data files.

Application Source Code 731 may be authored using ordinary program development tools. In other words, any extensions to programming language syntax or data files needed for expressing a language model (and phonetic variants) do not require special functionality from the development environment. Naturally, a source code preprocessor, compiler, and/or interpreter will need to recognize syntax extensions and convert them to executable form.

A preprocessor may be used to expand the disclosed programming constructs into code in the programming language before its interpretation or compilation. In an implementation, Compiler 721 may compile the application source code 731 into optimized machine instructions and data structures in a machine executable format such as depicted in Application Object Code 727. The machine code may call routines in a runtime library. In addition, data from Custom SLMs 711 (N-grams) may optionally be processed and stored in the application object code 727 in a form that is optimized for application access.

During the compilation process, the data that defines the (Semantic) Grammar 751 for the application is converted into a parser for the grammar. In an embodiment, the (semantic) grammar 751 may be expressed in programming constructs, such as described for the Terrier system, or the (semantic) grammar 751 may be specified in a data file (for example, a configuration file) apart from the application code. The compiled application code is likely to be optimized for a particular platform, and stored for later processing. These steps are important for efficiency, but do not fundamentally affect the functionality of the system.

In an alternate implementation, compiler 721 may translate the application source code 731 into a machine-independent format for input into an interpreter. The machine-independent format is not optimized for a particular runtime environment, but may aid in testing and debugging. Machine independent code can be run on a virtual machine, instead of directly on a physical machine. The code in machine-independent format may be saved and interpreted later.

Runtime Environment

Figure 8:
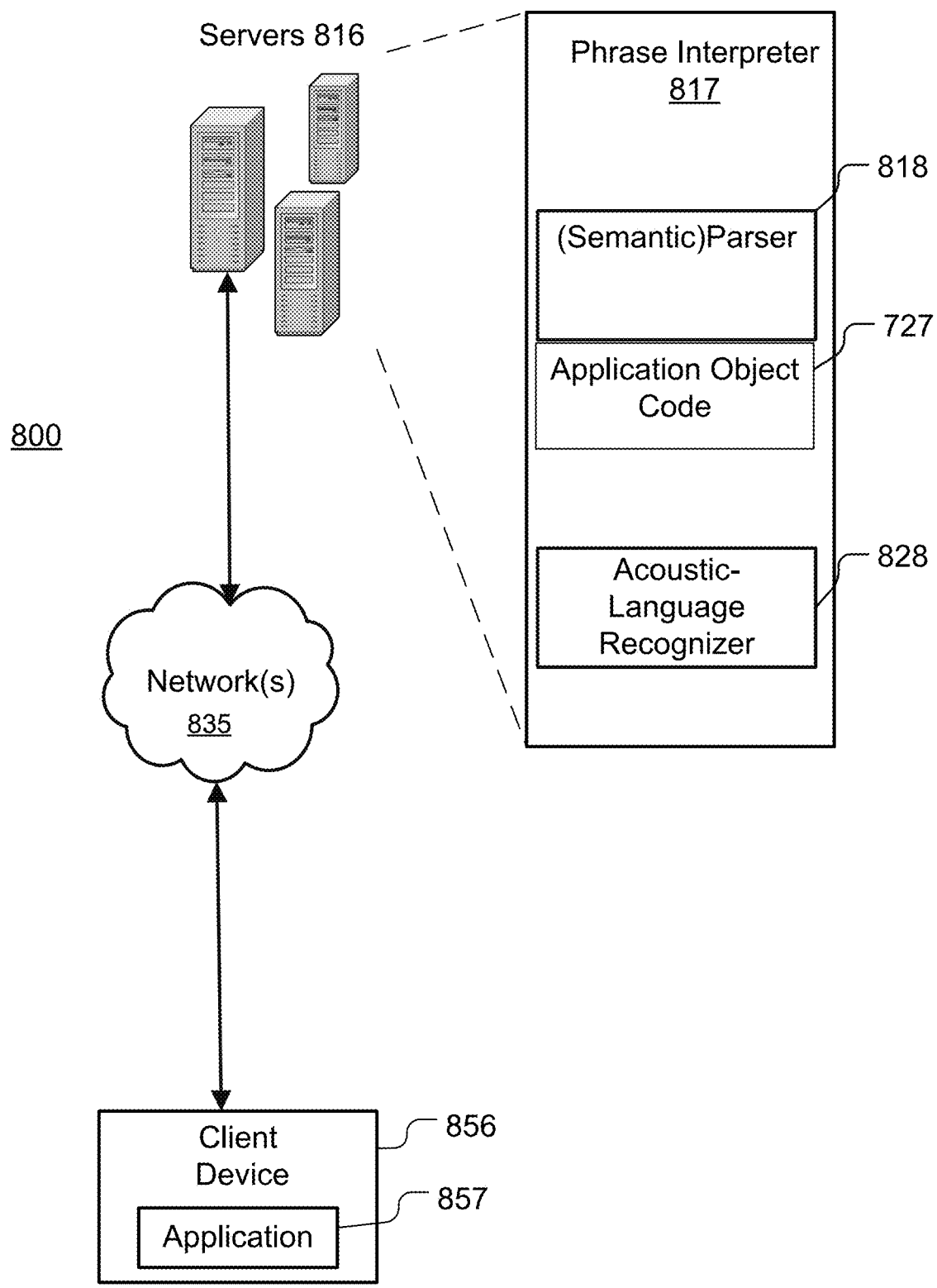
FIG. 8 provides additional detail regarding the application runtime environment, according to an implementation.

Once the application object code has been created, the natural language system is ready to receive and recognize natural language. FIG. 8 provides additional details regarding the application runtime environment. In these figures and throughout the application, where reference numbers are reused, such as reference 727 for the application object code, they refer to the same component as previously described.

The Runtime Environment 800 includes at least one Client Device 856, a Phrase Interpreter Engine 817, servers 816, and a Communications Network 835 that allows the various components of the environment to interact.

A user may use a device 856 for receiving voice or text input and for interacting with the natural language application. These devices may include handheld devices, such as smart phones and tablets, mobile devices such as laptops and workstations or PC, or smart appliances.

The functionality of the natural language application may run entirely on the client device 856, entirely on servers 816 accessed from the client device 856 by way of a web connection, or split between the client device 856 and servers 816. For example, in an implementation, Application 857 may prompt the user for text or speech input and display results returned from the server. Application 857 may also package up contextual information about the user and the client device for use by the server, and may provide compression or encryption on the request before sending the request over a network to the server. In this implementation, a server 816 may run the phrase interpreter 817 that includes the (Semantic) Parser 818 that includes the application object code 727. As explained above, the parser 818 is shown adjoined to the application object code 727 to suggest a tight integration between the two. The parser comprise both application-specific object code and general purpose runtime library routines, and the amount of work done by the one vs. the other may vary from one implementation to the other. The application object code may include compiled or data-driven implementations of application-specific language patterns and of corresponding application-specific actions to be taken. Many alternative runtime implementations exist in which the technology disclosed can be practiced, through the combinations of different components and environments.

In one implementation, the network 835 includes the Internet. The network 835 also can utilize dedicated or private communication links that are not necessarily part of the Internet. In one implementation the network 835 uses standard communication technologies and protocols, or inter-process communication.

Client device 856 receives audio input (such as speech) and sends the audio input to the phrase interpreter 817. Phrase interpreter 817 performs the processing illustrated on the left side of FIG. 1. The phrase interpreter 817 comprises a (semantic) parser 818 with behavior corresponding to (semantic) parser 133, the word to phoneme sequence translator 153, the phoneme matching module 163, and Acoustic Language Recognizer 828 with behavior corresponding to speech engine front end 183. The compiled application object code 727 may be included in the executable code of the (semantic) parser 818. In an interpreted environment, the (semantic) parser 818 may comprise an interpreter and the application object code 727 may comprise machine-independent code that is interpreted by the interpreter.

Applications operate in conjunction with the phrase interpreter engine 817 to understand spoken or text input. The client device 856 and Servers 816 each include memory for storage of data and software applications, a processor for accessing data in executing applications, and components that facilitate communication over the network 835.

The phrase interpreter engine 817 is implemented using at least one hardware component. The engines are implemented in hardware, firmware, or software running on hardware. Software that is combined with hardware to carry out the actions of a phrase interpreter engine 817 can be stored on computer readable media such a rotating or non-rotating memory. The non-rotating memory can be volatile or non-volatile. In this application, computer readable media does not include a transitory electromagnetic signal that is not stored in a memory; computer readable media stores program instructions for execution.

Of course, when a user types input or text input is received from another source, a (semantic) parser 818 can operate without an acoustic-language recognizer 828. Thus, the parser 818 is useful by itself and can operate in text-based environments that do not receive spoken input.

When processing spoken input, the acoustic language recognizer 828 produces token phrases and alternative token recognition hypotheses such as the alternate phoneme sequences with scores 173 of FIG. 1. At each time interval during interpretation of spoken input, hundreds or even thousands of token recognition hypotheses can be generated. To expand on this point, an interval such as every 10 or 100 milliseconds could be selected to test and generate token recognition hypotheses. At each interval, a thousand, three thousand, or an even larger number of hypotheses could be generated. In some implementations, enumeration of hypotheses could exhaust all combinatorial possibilities for hypotheses such as those illustrated in Table 1. These phoneme sequences may be passed to a language or linguistic stage that considers and scores sequences of phonemes.

In an implementation in which a statistic language model provides input to the parser, but are not processed and stored in an optimized manner during compilation of the application, the phrase interpreter 817 may at runtime access data structures storing the N-grams.

In an implementation in which a semantic grammar is used, the parser is a semantic parser. As such, the semantic parser, in addition to generating and scoring word sequences may also generate a meaning representation of one or more word sequences. An application may perform an action in response to recognizing certain word sequences such as that which may be specified in the action portion of an interpret statement of the Terrier system. The data in a meaning representation may provide input for the action taken by the application. For example, if the user asks a question, the application may first understand the question, then generate a response that answers the question.

Some Particular Implementations

In one implementation, an improved method of automated speech recognition and understanding is provided that is applicable where word pronunciation depends on a syntactic or semantic context. Words and phonemes are extracted from a digital signal representing an input utterance, and during the processing, default word pronunciations obtained from a global dictionary are overridden based on a phonetic variant in a local context of a specific production rule.

This method implementation can be combined with one or more of the following features. The phonetic variant can constrain pronunciation within the local context of the specific production rule, of a standard word that has multiple accepted pronunciations. It can include specifying the local word phonetic variant as a stylized spelling (i.e. an unusual spelling unlikely to be found in any standard dictionary) of a non-standard word that has an accepted pronunciation. For example, production rules in a music application may generate or recognize "Ke$ha" as a stylized spelling that would not typically be found in a dictionary.

In an implementation, a method is provided for recognizing speech. The method receives a digital signal representing a spoken utterance and generates one or more phoneme sequences from the spoken utterance. The one or more phoneme sequences is associated with a first score. One or more word sequences can be generated using production rules of a language model, the one or more word sequences associated with a second score assigned based on the language model. It can translate the one or more word sequences into corresponding phoneme sequences that represent one or more pronunciations of a word sequence, the translation including using a local phonetic variant as the pronunciation for a word instead of a default pronunciation associated with the word, within a local context of a production rule. The method matches a phoneme sequence translated from a word sequence with a phoneme sequence generated based on the spoken utterance, and assigns a score that indicates a relative likelihood that the word sequence corresponding to the phoneme sequence are the words spoken in the utterance.

This method implementation can be combined with one or more of the following features. The phoneme sequences corresponding to the one or more word sequences can be assigned a score, and an overall likelihood score can be assigned to a particular phoneme sequence. The particular phoneme sequence is assigned a first score when translated from a word sequence and a second score when generated based on the spoken utterance, the overall relative likelihood score is based on the first score and the second score. The language model can be a grammar, the local phonetic variant can be specified in a production rule of the grammar, and the local phonetic variant constrains the pronunciation of the word only when applying the production rule in which it is specified. The grammar can be a context-sensitive grammar and or a semantic grammar. When the grammar is a semantic grammar, a meaning representation is generated for each word sequence recognized by the grammar.

The implementation may have additional features as follows. The grammar can be a stochastic grammar and word sequences generated from the language model are assigned a score based on weights associated with the production rules executed to produce the word sequence.

The local phonetic variant can be expressed using a phoneme set as a phonetic alphabet. The phonetic variant may include an indication that the word is written but not spoken, causing the production rule to fail on speech input.

The production rules (or N-grams) can include specifying the local word phonetic variant as constraining pronunciation, within the local context of the specific production rule (or N-gram), of a standard word that has multiple accepted pronunciations. The local phonetic variant specifies that for a particular word with an accepted pronunciation, the particular word has a stylized spelling not found in a default phonetic dictionary.

The same production rules including extended syntax specifying a phonetic variant can be used for both text input and speech input. The extended syntax may include syntax that supports differential application of the rules. Within the same implementation a received textual input may be parsed using the same production rules that are used to parse the speech input.

While the technology has been disclosed in the context of a method, it also can be practiced as a system or computer readable medium. A system is a computerized system. It typically includes a server, workstation, PC, portable computing device, smart phone or other device with memory and a processor or other hardware the carries out program steps.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

APPENDIX I

| CMUP (CMU Phoneme Set) | |
|---|---|
| AA | odd AA D |
| AE | at AE T |
| AH | hut HH AH T |
| AO | ought AO T |
| AW | cow K AW |
| AY | hide HH AY D |
| B | be B IY |
| CH | cheese CH IY Z |
| D | dee D IY |
| DH | thee DH IY |
| EH | Ed EH D |
| ER | hurt HH ER T |
| EY | ate EY T |
| F | fee F IY |
| G | green G R IY N |
| HH | he HH IY |
| IH | it IH T |
| IY | eat IY T |
| JH | gee JH IY |
| K | key K IY |
| L | lee L IY |
| M | me M IY |
| N | knee N IY |
| NG | ping P IH NG |
| OW | oat OW T |
| OY | toy T OY |
| P | pee P IY |
| R | read R IY D |
| S | sea S IY |
| SH | she SH IY |
| T | tea T IY |
| TH | theta TH EY T AH |
| UH | hood HH UH D |
| UW | two T UW |
| V | vee V IY |
| W | we W IY |
| Y | yield Y IY L D |
| Z | zee Z IY |
| ZH | seizure S IY ZH ER |

The table above shows the CMU Phoneme Set (CMUP) with examples for each phoneme. Vowels may be followed by a stress indicator: 0 denotes the absence of stress, 1 indicates a stressed syllable, and 2 indicates secondary stress.

What is claimed is:
1. A method of automatic speech recognition comprising:
extracting speech features from a digital signal representing a speech input;
computing, from the extracted speech features, candidate phoneme sequences and phoneme sequence scores corresponding to the candidate phoneme sequences;

mapping the candidate phoneme sequences to corresponding candidate word sequences;

computing, based on the phoneme sequence scores, word sequence scores corresponding to the candidate word sequences;

parsing the candidate word sequences that correspond to the candidate phoneme sequences according to a grammar rule comprising (i) a phonetic variant of at least one word of the grammar rule to produce a parse score for each candidate word sequence of the candidate word sequences that correspond to the candidate phoneme sequences and (ii) a description of a pronunciation of the at least one word;

computing an overall score for each of the parsed candidate word sequences based, at least in part, on combining the word sequence scores computed from the corresponding candidate phoneme sequences with parse scores produced from the parsing; and selecting, as a transcription of the speech input, a candidate word sequence among the parsed candidate word sequences having a highest overall score, wherein the description of the pronunciation of the at least one word comprises a weight that indicates a likelihood of the pronunciation in the grammar rule.

2. The method of claim 1, wherein the phonetic variant constrains a pronunciation of a word that has multiple accepted pronunciations.

3. The method of claim 1, wherein the phonetic variant supports a stylized spelling of a non-standard word that has an accepted pronunciation.

4. The method of claim 1, wherein the grammar rule is part of a grammar and the grammar is a semantic grammar.

5. The method of claim 1, wherein the phonetic variant is expressed using a phonetic alphabet.

6. The method of claim 1, wherein the phonetic variant is expressed using a word with an unambiguous pronunciation.

7. The method of claim 1, wherein the phonetic variant includes an indication that at least one word of the grammar rule may be written in a transcription, but not spoken.

8. A non-transitory computer readable storage medium storing instructions that, when executed by a processor, cause the processor to:

extract speech features from a digital signal representing a speech input;

compute, from the extracted speech features, candidate phoneme sequences and phoneme sequence scores corresponding to the candidate phoneme sequences;

map the candidate phoneme sequences to corresponding candidate word sequences;

compute, based on the phoneme sequence scores, word sequence scores corresponding to the candidate word sequences;

parse the candidate word sequences that correspond to the candidate phoneme sequences according to a grammar rule comprising (i) a phonetic variant of at least one word of the grammar rule to produce a parse score for each candidate word sequence of the candidate word sequences that correspond to the candidate phoneme sequences and (ii) a description of a pronunciation of the at least one word;

compute an overall score for each of the parsed candidate word sequences based, at least in part, on combining the word sequence scores computed from the corresponding candidate phoneme sequences with parse scores produced from the parsing; and select, as a transcription of the speech input, a candidate word sequence among the parsed candidate word sequences having a highest overall score, wherein the description of the pronunciation of the at least one word comprises a weight that indicates a likelihood of the pronunciation in the grammar rule.

9. The method of claim 1, wherein the grammar rule is part of a grammar and the grammar is context-free.

10. The non-transitory computer readable storage medium of claim 8, wherein the grammar rule is part of a grammar and the grammar is context-free.

11. A system including one or more processors coupled to memory, the memory being loaded with computer instructions for automatic speech recognition, the computer instructions, when executed on the one or more processors, causing the one or more processors to implement actions comprising:

extracting speech features from a digital signal representing a speech input;

computing, from the extracted speech features, candidate phoneme sequences and phoneme sequence scores corresponding to the candidate phoneme sequences;

mapping the candidate phoneme sequences to corresponding candidate word sequences;

computing, based on the phoneme sequence scores, word sequence scores corresponding to the candidate word sequences;

parsing the candidate word sequences that correspond to the candidate phoneme sequences according to a grammar rule comprising (i) a phonetic variant of at least one word of the grammar rule to produce a parse score for each candidate word sequence of the candidate word sequences that correspond to the candidate phoneme sequences and (ii) a description of a pronunciation of the at least one word;

computing an overall score for each of the parsed candidate word sequences based, at least in part, on combining the word sequence scores computed from the corresponding candidate phoneme sequences with parse scores produced from the parsing; and selecting, as a transcription of the speech input, a candidate word sequence among the parsed candidate word sequences having a highest overall score, wherein the description of the pronunciation of the at least one word comprises a weight that indicates a likelihood of the pronunciation in the grammar rule.

12. The non-transitory computer readable storage medium of claim 8, wherein the phonetic variant constrains a pronunciation of a word that has multiple accepted pronunciations.

13. The non-transitory computer readable storage medium of claim 8, wherein the phonetic variant supports a stylized spelling of a non-standard word that has an accepted pronunciation.

14. The non-transitory computer readable storage medium of claim 8, wherein the grammar rule is part of a grammar and the grammar is a semantic grammar.

15. The non-transitory computer readable storage medium of claim 8, wherein the phonetic variant is expressed using a phonetic alphabet.

16. The non-transitory computer readable storage medium of claim 8, wherein the phonetic variant is expressed using a word with an unambiguous pronunciation.

17. The non-transitory computer readable storage medium of claim 8, wherein the phonetic variant includes an indication that at least one word of the grammar rule may be written in a transcription, but not spoken.

18. The system of claim 11, wherein the phonetic variant constrains a pronunciation of a word that has multiple accepted pronunciations.

19. The system of claim 11, wherein the phonetic variant supports a stylized spelling of a non-standard word that has an accepted pronunciation.

20. The system of claim 11, wherein the grammar rule is part of a grammar and the grammar is a semantic grammar.

21. The system of claim 11, wherein the phonetic variant is expressed using a phonetic alphabet.

22. The system of claim 11, wherein the phonetic variant is expressed using a word with an unambiguous pronunciation.

23. The system of claim 11, wherein the phonetic variant includes an indication that at least one word of the grammar rule may be written in a transcription, but not spoken.

24. The system of claim 11, wherein the grammar rule is part of a grammar and the grammar is context-free.

\* \* \* \* \*